United States Patent
Sakhnini et al.

(10) Patent No.: US 11,470,564 B2
(45) Date of Patent: Oct. 11, 2022

(54) LEAN SYNCHRONIZATION SIGNAL BLOCKS FOR REDUCED CAPABILITY DEVICES

(71) Applicant: QUALCOMM Incorporated, San Diego, CA (US)

(72) Inventors: Iyab Issam Sakhnini, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 61 days.

(21) Appl. No.: 17/150,129

(22) Filed: Jan. 15, 2021

(65) Prior Publication Data

US 2021/0258895 A1    Aug. 19, 2021

Related U.S. Application Data

(60) Provisional application No. 62/976,118, filed on Feb. 13, 2020.

(51) Int. Cl.
*H04W 56/00* (2009.01)
*H04W 16/28* (2009.01)
(Continued)

(52) U.S. Cl.
CPC .......... *H04W 56/001* (2013.01); *H04W 8/22* (2013.01); *H04W 16/28* (2013.01); *H04W 24/08* (2013.01)

(58) Field of Classification Search
CPC ..... H04W 56/001; H04W 8/22; H04W 16/28; H04W 24/08; H04W 48/12; H04W 48/16; H04W 56/0015
See application file for complete search history.

(56) References Cited

U.S. PATENT DOCUMENTS

2019/0313440 A1   10/2019   John Wilson et al.

FOREIGN PATENT DOCUMENTS

| CN | 112106430 A | * | 12/2020 | ........... H04L 1/0005 |
| WO | WO-2020024218 A1 | | 2/2020 | |
| WO | WO-2020186946 A1 | * | 9/2020 | ............ H04W 24/02 |

OTHER PUBLICATIONS

Herranz C., et al., "A 3GPP NR Compliant Beam Management Framework to Simulate End-to-End mmWave Networks", Modeling, Analysis And Simulation Of Wireless And Mobile Systems, ACM, 2 Penn Plaza, Suite 701 New York NY 10121-0701USA, Oct. 25, 2018 (Oct. 25, 2018), pp. 119-125, XP058417898, DOI: 10.1145/3242102.3242117, ISBN: 978-1-4503-5960-3 Point 3.5.

(Continued)

*Primary Examiner* — Said M Elnoubi
(74) *Attorney, Agent, or Firm* — Holland & Hart LLP

(57) ABSTRACT

Methods, systems, and devices for wireless communications are described. A synchronization signal block (SSB) may include a primary synchronization signal (PSS), a secondary synchronization signal (SSS), and a physical broadcast channel (PBCH). According to the techniques described herein, a lean SSB design may include one of either the PSS or the SSS (e.g., such that the lean SSB may include, for example, 12 resource blocks compared to the 20 resource blocks associated with an SSB). As such, a lean SSB may be transmitted within a configured narrow bandwidth part (NBWP) and may support reduced capability devices (e.g., bandwidth reduced user equipment (UEs)) while maintaining compatibility with other devices (e.g., traditional or full capability devices). The techniques described herein may further provide for lean SSB repetition, beam management (e.g., narrower beams) enabled via lean SSBs, data inclusion in remaining symbols of lean SSBs, etc.

29 Claims, 17 Drawing Sheets

(51) Int. Cl.
  *H04W 8/22* (2009.01)
  *H04W 24/08* (2009.01)

(56) References Cited

OTHER PUBLICATIONS

International Search Report and Written Opinion—PCT/US2021/013984—ISA/EPO—May 17, 2021.
Kryukov Y., et al., "Cell Search and Synchronization in 5G NR," Nov. 27, 2019 (Nov. 27, 2019), XP055795925, DOI: 10.1051/itmconf Retrieved from the Internet: URL: https://www.itm-conferences.org/articles/itmconf/pdf/2019/07/itmconf_crimico2019_04007.pdf [retrieved on Apr. 15, 2021] p. 2, paragraph 5-paragraph 6 figure 1, 4 pages.

* cited by examiner

LEAN SYNCHRONIZATION SIGNAL BLOCKS FOR REDUCED CAPABILITY DEVICES

CROSS REFERENCE

The present Application for Patent claims the benefit of U.S. Provisional Patent Application No. 62/976,118 by SAKHNINI et al., entitled "LEAN SYNCHRONIZATION SIGNAL BLOCKS FOR REDUCED CAPABILITY DEVICES," filed Feb. 13, 2020, assigned to the assignee hereof, and expressly incorporated by reference herein.

BACKGROUND

The following relates generally to wireless communications, and more specifically to lean synchronization signal blocks (SSBs) for reduced capability devices.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

In some cases, a UE may perform a synchronization procedure during initial access to establish a connection via a channel. The UE may receive synchronization signals and system information from a base station, however, the UE may perform a number of steps before receiving the system information. For example, a UE may receive and decode an SSB, a master information block (MIB), a set of control resources, a downlink control channel, and a downlink shared channel to receive the system information. In some cases, some synchronization steps may be a computation burden on the UE, and other techniques for synchronization may have limitations for different types of devices including devices employing coverage enhancement or reduced computational complexity.

SUMMARY

The described techniques relate to improved methods, systems, devices, and apparatuses that support lean synchronization signal blocks (SSBs) for reduced capability devices. Generally, the described techniques provide for a lean SSB design (e.g., for a subset of signals in an SSB). For example, an SSB may include a primary synchronization signal (PSS), a secondary synchronization signal (SSS), and a physical broadcast channel (PBCH). According to the techniques described herein, a lean SSB may include one of either the PSS or the SSS (e.g., such that the lean SSB may include, for example, 12 resource blocks compared to the 20 resource blocks associated with an SSB). As such, a lean SSB may be transmitted within a configured narrow bandwidth part (NBWP) and may support reduced capability devices (e.g., bandwidth reduced user equipment (UEs)) while maintaining compatibility with other devices (e.g., traditional or full capability devices). The techniques described herein may further provide for lean SSB repetition, beam management (e.g., narrower beams) enabled via lean SSBs, data inclusion in remaining symbols of lean SSBs, etc.

DETAILED DESCRIPTION

Figure 1:
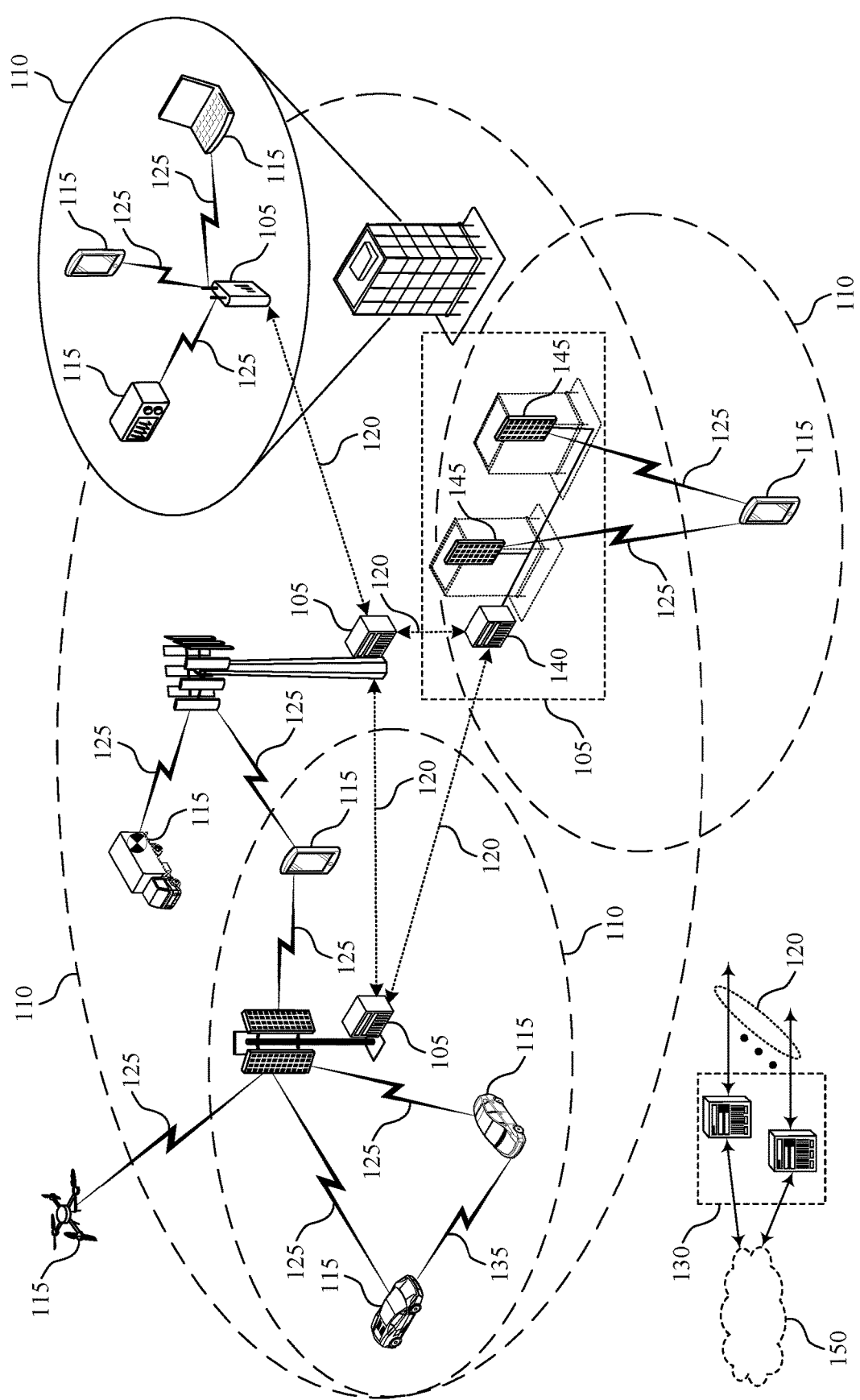
FIG. 1 illustrates an example of a system for wireless communications that supports lean synchronization signal blocks (SSBs) for reduced capability devices in accordance with aspects of the present disclosure.

A base station may transmit one or more synchronization signal blocks (SSBs) to a user equipment (UE), and the UE may process (e.g., decode) the SSBs in order to obtain system information and begin communications with the base station. An SSB (e.g., a synchronization block) may include synchronization signals such as a primary synchronization signal (PSS), a physical broadcast channel (PBCH), and a secondary synchronization signal (SSS), which may be referred to as acquisition signals and may be transmitted from the base station to the UE. The PSS, PBCH, and SSS may each occupy different sets of symbols (e.g., orthogonal frequency division multiplexing (OFDM) symbols) and sub-carriers of the SSB. A UE may utilize SSBs to acquire downlink synchronization information and system information (e.g., to establish a communication channel with the base station). In some cases, some wireless communications systems may further utilize SSBs with beam sweeping for beam management purposes.

A reduced capability UE (e.g., a low tier UE or a New Radio (NR)-light UE) may operate with one or more of a reduced transmit power, a reduced number of transmit and/or receive antennas, a reduced transmit/receive bandwidth, or reduced computational complexity. For example, a reduced capability UE may be a smart wearable device, an industrial sensor, a video surveillance device, etc. The techniques described herein may provide for a lean SSB design to reduce SSB bandwidth and support beam management functionality for reduced capability UEs. According to the described techniques, reduced capability UEs may thus reduce power consumption and conserve computational resources by reducing its operating bandwidth (e.g., compared to operating bandwidth associated with monitoring of traditional SSBs).

The described lean SSB designs may support narrow bandwidth part (NBWP) configuration for reduced capability UEs. For example, a lean SSB may include one of either the PSS or the SSS (e.g., such that the lean SSB may include, for example, 12 resource blocks compared to the 20 resource blocks associated with an SSB). As such, a base station may beam sweep lean SSBs in a NBWP, and reduced capability UEs may use lean SSBs for beam management purposes. The techniques described herein may further provide for lean SSB repetition, beam management (e.g., narrower beams) enabled via lean SSBs, data inclusion in remaining symbols of lean SSBs, etc.

Moreover, the techniques described herein may reduce SSB bandwidth (e.g., via the lean SSB design) for NBWP configuration (e.g., a lean SSB may reduce SSB bandwidth from 20 resource blocks to 12 resource blocks via exclusion of PBCH). Further, in some cases, a lean SSB may include a synchronization signal (e.g., a PSS or SSS) spanning a single symbol. As such, lean SSBs may make available more symbols in time to provide for synchronization signal repetition (e.g., in case of coverage recovery), more beams for finer beam sweeping granularity (e.g., as lean SSBs may allow for narrower beams or better coverage), more symbols for other channels (e.g., such as for physical downlink shared channel (PDSCH) data), etc. Further, the described lean SSB design and configuration may maintain compatibility with other devices (e.g., with traditional or full capability devices) and may minimize any physical layer (e.g., L1) disruptions or changes in existing wireless communications systems.

Aspects of the disclosure are initially described in the context of a wireless communications system. Example lean SSB signaling diagrams and an example process flow are then described. Aspects of the disclosure are further illustrated by and described with reference to apparatus diagrams, system diagrams, and flowcharts that relate to lean SSBs for reduced capability devices.

FIG. 1 illustrates an example of a wireless communications system 100 that supports lean SSBs for reduced capability devices in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T\_s=1/((\Delta f\_max \cdot N\_f))$ seconds, where $\Delta f\_max$ may represent the maximum supported subcarrier spacing, and $N\_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., N\_f) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The network operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, for example, in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the media access control (MAC) layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Wireless communications system 100 may support reduced capability UEs 115, which may also be referred to as low tier UEs 115, NR-Light UEs 115, etc. A reduced capability UE may operate with one or more of a reduced transmit power, a reduced number of transmit and/or receive antennas, a reduced transmit/receive bandwidth, or reduced computational complexity. For example, a reduced capability UE may be a smart wearable device, an industrial sensor, a video surveillance device, etc. In some cases, reduced capability UEs 115 may be associated with a reduced number of UE receive/transmit antennas, UE bandwidth reduction, half-duplex-FDD, relaxed UE processing time, relaxed UE processing capability, etc. As such, wireless communications system 100 may support UE power saving and battery lifetime enhancement for reduce capability UEs 115 in applicable use cases (e.g., in delay tolerant use cases). For example, wireless communications system 100 may support techniques such as reduced physical downlink control channel (PDCCH) monitoring by smaller numbers of blink decodes and control channel element (CCE) limits, extended discontinuous reception (DRX) for radio resource control (RRC) Inactive and/or Idle, radio resource management (RRM) relaxation for stationary devices, etc.

As described herein, wireless communications system 100 may support reduced capability UEs 115 via a leaner SSB design, NBWP configuration, etc. For example, wireless communications system 100 may utilize SSBs with beam sweeping for beam management purposes. The described lean SSBs may be utilized to maintain such functionality for reduced capability UEs 115. For example, an SSB (e.g., a generic SSB or an SSB transmitted within a BWP for traditional or full capability UEs 115) may include a PSS, an SSS, and a PBCH. According to the techniques described herein, a lean SSB may include one of either the PSS or the SSS (e.g., such that the lean SSB may include, for example, 12 resource blocks compared to the 20 resource blocks associated with an SSB). As such, a lean SSB may be transmitted (e.g., base stations 105 may beam sweep lean SSBs) within a configured NBWP to support reduced capability devices (e.g., bandwidth reduced UEs 115) while maintaining compatibility with other devices (e.g., with other traditional or full capability UEs 115). Wireless communications system 100 may further support lean SSB repetition, beam management (e.g., narrower beams) enabled via lean SSBs, data inclusion in remaining symbols of lean SSBs, etc., as described herein.

Figure 2:
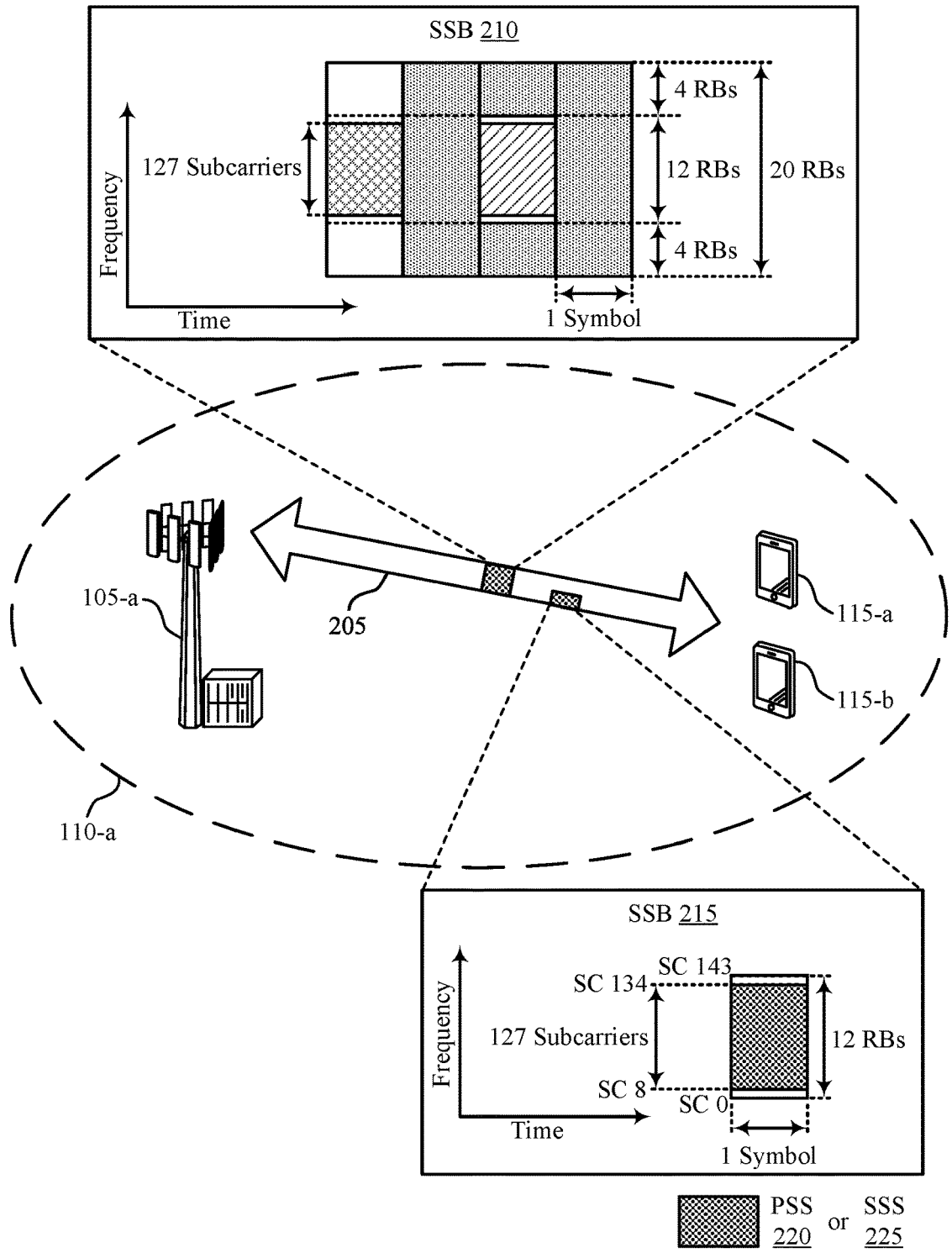
FIG. 2 illustrates an example of a wireless communications system that supports lean SSBs for reduced capability devices in accordance with aspects of the present disclosure.

FIG. 2 illustrates an example of a wireless communications system 200 that supports lean SSBs for reduced capability devices in accordance with aspects of the present disclosure. In some examples, wireless communications system 200 may implement aspects of wireless communications system 100. Wireless communications system 200 may include base station 105-a, UE 115-a, and UE 115-b, which may be examples of a base station 105 and UEs 115, respectively, as described with reference to FIG. 1. Base station 105-a, UE 115-a, and UE 115-b may be configured to use lean SSBs 215 in accordance with the techniques described herein.

In some examples, base station 105-a may be an NR base station communicating via link 205 with UEs 115-a and 115-b within coverage area 110-a. In some cases, base station 105-a may transmit an SSB 210 (e.g., a generic SSB 210 via a BWP). SSB 210 may be used by a UE 115 to synchronize with a cell (e.g., base station 105-a). The y-axis of SSB 210 may show frequency while the x-axis shows time. The SSB 210 may include four OFDM symbols (symbol periods). The first symbol may include a PSS 220. In some examples, the PSS 220 may occupy 127 subcarriers. The second and fourth symbols may include PBCH 230, which may each span the 20 RBs. The third symbol may include SSS 225, which may occupy 127 subcarriers, in between two portions of PBCH 230, each portion spanning 4 RBs. For example, a UE 115 may receive a PSS 220 in a first symbol period of SSB 210 and may identify the SSB 210 based on detection (e.g., peak correlation) of the PSS 220. Accordingly, the UE 115 may proceed to decode the PBCH 230 and SSS 225 of the SSB 210.

In some cases, SSB 210 may be a cell defining SSB. For example, within the frequency span of a carrier, multiple SSBs 210 may be transmitted by the base station 105-a to UEs 115. The Physical Cell Identifiers (PCIs) of SSBs 210 transmitted in different frequency locations may not necessarily be unique to the cell. Thus, the PCIs may not be the same, and different SSBs in the frequency domain may have different PCIs. When an SSB 210 is associated with remaining minimum system information (RMSI), the SSB may correspond to an individual cell, which may have a unique NR Cell Global Identifier (NCGI). Such an SSB 210 with the unique NCGI may be referred to as a cell defining SSB. In some cases, cell selection and/or reselection, by a UE 115, may be based on one or more reference signal receive power (RSRP) or reference signal receive quality (RSRQ) measurements of the cell defining SSB. In some examples, after a UE 115 receives the SSB 210, the UE 115 may decode the SSB 210 to identify the master information block (MIB). The MIB may indicate the CORESET and synchronization signal configuration, which may allow the UE 115 to receive and decode the PDCCH. The PDCCH may indicate the PDSCH to the UE 115, which may include the system information block (SIB) that includes the RMSI.

Further, in some cases, wireless communications system 200 may utilize SSBs 210 may to establish and/or maintain synchronization and beam management between base station 105-a and UEs 115. For example, SSBs 210 may be used for time/frequency tracking at a UE 115 to allow for time tracking loops and/or frequency tracking loops to be maintained by the UE 115. In other words, a UE 115 may utilize SSBs 210 for beam management procedures, which may include, for example, the UE 115 updating a beam configuration for any downlink resources (e.g., such as one or more updates to time tracking parameters in a time tracking loop or one or more updates to frequency tracking parameters in a frequency tracking loop). In some cases, updating a beam configuration may include updating from a first set of beams for transmission and reception to a second set of beams for improved transmission and reception. SSBs 210 may be used, in some cases, for time/frequency tracking for a particular bandwidth (or BWP), to measure a delay spread, a delay offset, a power delay profile, a Doppler spread, a Doppler offset, timing information, frequency offset information, receive spatial filtering, etc.

In some cases, a first type of UE, such as a reduced capability UE 115-b (e.g., a low tier UE 115-b or an NR-Light UE 115-b) may include lower UE capabilities compared to a second type of UE, such as a generic UE 115-a (e.g., a full capability UE 115-a or a premium UE 115-a). As discussed herein, lean SSBs 215 may reduce SSB bandwidth (e.g., compared to SSBs 210) and support beam management functionality for reduced capability UEs (e.g., such as for reduced capability UE 115-b). Lean SSBs 215 may provide for reduced bandwidth and lower computational complexity (e.g., and thus reduced power consumption) for a reduced capability UE 115-b, as reduced capability UE 115-b may be configured with a NBWP and may not be configured to decode the larger spanning bandwidth (e.g., 20 resource blocks) associated with SSBs 210.

Lean SSBs 215 may include a synchronization signal over a reduced bandwidth (e.g., compared to SSBs 210). For example, leans SSBs may include a synchronization signal spanning 127 subcarriers in frequency and a single symbol in time (e.g., the y axis of SSB 215 may show frequency while the x axis shows time). The synchronization signal may include a PSS 220 or an SSS 225 such that lean SSBs 215 may be used for beam management by reduced capability UEs (e.g., UE 115-b) as described herein. For example, during beam adjustments or beam maintenance (e.g., beam management procedures), the PBCH may be unnecessary, and since a UE 115 may already know the PCI and may already be time aligned with the network, both PSS 220 and SSS 225 may also not be necessary. As such, lean SSBs 215 may be reduced to one of either PSS 220 or SSS 225. In other words, lean SSBs 215 may exclude PBCH 230 included in SSBs 210 (e.g., which may reduce the bandwidth of lean SSBs 215 from 20 resource blocks (RBs) associated with SSBs 210 down to 12 RBs). For instance, excluding the PBCH 230 from a lean SSB 215 may leave 12 RBs which may be the same as PSS 220 or SSS 225. As such, lean SSBs 215 may include one of either PSS 220 or SSS 225, as PSS 220 and SSS 225 have similar design (e.g., length-127 M-sequence) and either can be used for the purpose of beam management.

Further, as lean SSBs 215 may include one of either PSS 220 or SSS 225 (e.g., with the other of the PSS 220 or SSS 225 and the PBCH excluded), lean SSBs 215 may span one symbol in the time domain. In some cases, wireless communications system 200 may maintain time continuity between SSBs 210 and lean SSBs 215. As such, more symbols in time may be available when utilizing lean SSBs 215 (e.g., as there may be three remaining symbols, in addition to the single symbol of the lean SSB 215, for time continuity with the four symbols of an SSB 210). The additional available symbols in time (e.g., the three additional symbols) may be utilized for synchronization signal repetition (e.g., in case of coverage recovery). Additionally or alternatively, the additional available symbols in time may be utilized for more beams to sweep (e.g., may allow for narrower beams and possibly improved coverage). Additionally or alternatively, the additional available symbols in time may be utilized for more symbols for other channels (e.g., the additional symbols may include PDSCH).

The techniques described herein may avoid ambiguity between SSBs 210 and lean SSBs 215. For example, generic UEs (e.g., legacy UEs, such as UE 115-a) may not detect lean SSBs 215 (e.g., generic UEs 115 may not detect peak correlations due to lean SSBs 215, which may otherwise result in generic UE 115 detection of the lean SSB 215). For instance, center frequencies for lean SSBs 215 may not coincide with SSB 210 synchronization raster, PSS 220 associated with lean SSBs 215 may use different M-sequence parameters to generate the PSS 220 of a lean SSB 215, etc.

As discussed, in some examples, center frequencies for lean SSBs 215 may not coincide with SSB 210 synchronization raster. In some cases, lean SSBs 215 may use different M-sequence parameters to generate the lean SSB 215 using in a NBWP with some mapping to the original SSB 210. For example, in some cases, lean SSBs 215 may use different M-sequence parameters to generate a PSS 220 (e.g., of a lean SSB 215) used in a NBWP with some mapping to the original PSS 220 (e.g., of an SSB 210). For example, $N_{ID_{NB\text{-}BWP}}^{(2)} = N_{ID}^{(2)} + \delta$ (e.g., where $\delta \geq 3$ may be preconfigured by the wireless communications system or may be signaled from base station 105-a to UEs 115). For example, the M-sequence parameters to generate a PSS 220 (e.g., for SSBs 210) may include a cell identity within the group ($N_{ID}^{(2)}$), and the M-sequence parameter to generate the PSS 220 for a lean SSB 215 may include a cell identity within the group for the NBWP ($N_{ID_{NB\text{-}BWP}}^{(2)}$) which may be some offset $\delta$ from $N_{ID}^{(2)}$.

In some cases, lean SSBs 215 may include SSS 225 (e.g., such that generic UEs 115 may not detect a PSS 220 and thus may not detect lean SSBs 215, however reduced capability UE 115-b may be configured to detect the SSS 225 of lean SSBs 215). For instance, in examples where lean SSBs 215 include SSS 225, confusion for UEs 115 performing initial access procedures and generic UEs 115 may be avoided (e.g., as UEs 115 may not be aware that a PSS 220 may not have an associated SSS 225 and PBCH 230 with it). Additionally or alternatively, center frequency offset techniques, M-sequence parameter offset techniques, etc. may be implemented to mitigate undesired detection (e.g., peak correlation detections) of lean SSBs 215 in scenarios where such detection may degrade system performance.

For example, during initial acquisition, UEs 115 may search for PSS sequences (e.g., PSS 220) first and then SSS 225. According to the techniques described herein, UEs 115 doing initial access (e.g., reduced capability UEs 115 doing initial access), and generic UEs 115 in general, may not increase their probability of finding peak correlations within NBWP regions. In some cases, NBWP center frequency adjustments/restrictions, synchronization signal sequence changes (e.g., lean SSB M-sequence changes), etc. may be used for lean SSB 215 designs including PSS 220 and for lean SSB 215 designs including SSS 225. In some cases, lean SSB 215 designs including SSS 225 may not necessarily use NBWP center frequency adjustments/restrictions, synchronization signal sequence changes (e.g., lean SSB M-sequence changes), etc., as lean SSBs 215 including SSS 225 may not result in ambiguity potentially arising from detection of PSS 220 within a NBWP.

If UE 115-a is a generic or regular capability UE 115 and a lean SSB 215 is associated with reduced capability UEs 115, then UE 115-a may not monitor for (e.g., may not detect peak PSS correlation for) the lean SSB 215 (e.g., such that lean SSBs 215 may be compatible with other UEs 115 such as UE 115-a). If UE 115-b is a reduced capability or low tier UE 115, the UE 115-b may proceed with the synchronization and decoding of the lean SSB 215 based on the configuration of the lean SSB (e.g., and the NBWP).

For example, for some wireless communications systems (e.g., frequency range 2 (FR2) systems), start symbols for SSBs 210 may be configured such that SSBs 210 may be repeated (e.g., 64 times) where, in some cases, different beams may be used by base station 105-a to beam sweep the SSBs 210. For instance for a 120 kHz SCS in a FR2 system, the SSB symbol start may be configured as:

$\{4, 8, 16, 20\} + 28 * n$, where $n = 0, 1, 2, 3, 5, 6, 7, 8, 10, 11, 12, 13, 15, 16, 17, 18$ Such may result in SSB 210 being repeated 64 times where each SSB 210 may be associated with a different beam.

As discussed herein, lean SSBs 215 may maintain the 12 RB structure (e.g., in the frequency domain) with gaps on either side of the synchronization signal (e.g., on either side of the PSS 220 or SSS 225). That is, lean SSBs 215 may include 12 RBs, where the center 127 subcarriers are used for PSS 220 or SSS 225 and the gaps on either side (e.g., subcarrier (SC) 0 though SC7 and SC135 through SC143) may be set to zero (0). In the time domain (e.g., to reduce or minimize impact on other non-SSB channels), the symbol start times and symbols reserve/gaps may be maintained across SSBs 210 and lean SSBs 215.

As lean SSBs 215 may include a single symbol for the synchronization signal, the remaining three symbols (e.g., in total corresponding in time with four symbols of SSBs 210) may be used advantageously by the wireless communications system 200. For example, wireless communications system 200 may configure synchronization signal repetitions per beam (e.g., the synchronization signal may be repeated up to four times across the four symbols, for enhanced coverage of up to, for example, 6 dB improvement). Additionally or alternatively, wireless communications system 200 may configure an increased number of beams, as NBWP may support narrower beams for enhanced coverage (e.g., up to 64×4=256 beams may be supported due to the lean SSB 215 and the four symbol durations). Additionally or alternatively, wireless communications system 200 may configure other data or information that may be communicated in the additional three symbols (e.g., wireless communications system 200 may configure PDSCH transmission in one or more of the additional three symbols).

In some cases, base station 105-a may configure and signal downlink reference signal resources to UEs 115 with transmission configuration indicator (TCI) states. In some examples, TCI states may indicate a quasi-colocation (QCL) relationship for a downlink transmission (e.g., PDCCH and PDSCH communications) with different reference signals. As such, each TCI state may include one reference signal set for different QCL types. As such, wireless communications system 200 may configure lean SSBs 215 to be QCL'ed with other reference signals. Also, tracking reference signal (TRS), channel state information reference signal (CSI-RS), and demodulation reference signal (DMRS) (e.g., for PDSCH and PDCCH) may be QCL'ed with lean SSBs 215.

For example, wireless communications system 200 may configure one or more of the following QCL relationships:

SSB 210→Lean SSB 215

Lean SSB 215→TRS

Lean SSB 215→CSI-RS for beamforming

Lean SSB 215→CSI-RS for CSI

Lean SSB 215→DMRS for PDCCH (if no TRS configured)

Lean SSB 215→DMRS for PDSCH (if no TRS configured)

The described techniques may provide for lean SSBs 215 for reduced capability UEs 115 (e.g., for beam management procedures performed by reduced capability UE 115-b). Thus, a reduced capability UE 115 may conserve power, reduce bandwidth, etc. by reducing its operating bandwidth otherwise associated with SSBs 210 used for beam management procedures, by avoiding decoding computations associated with PBCH 230, etc. Further, according to techniques described herein, generic or full capability UEs 115 may not detect (e.g., or may ignore) such lean SSBs (e.g., within configured NBWP) that are associated with reduced capability UEs, and generic or full capability UEs 115 may instead maintain utilization of SSBs 210 without interruption by (e.g., undesired detection of peak correlation of) lean SSBs 215. The example techniques described (e.g., with reference to SSBs 210 and lean SSBs 215) may be applied in other examples (e.g., for other transmissions, such as other control transmissions in addition to SSBs) to support reduced capability UEs 115, NBWP configuration, etc.

Figures 3A, 3B, 3C:
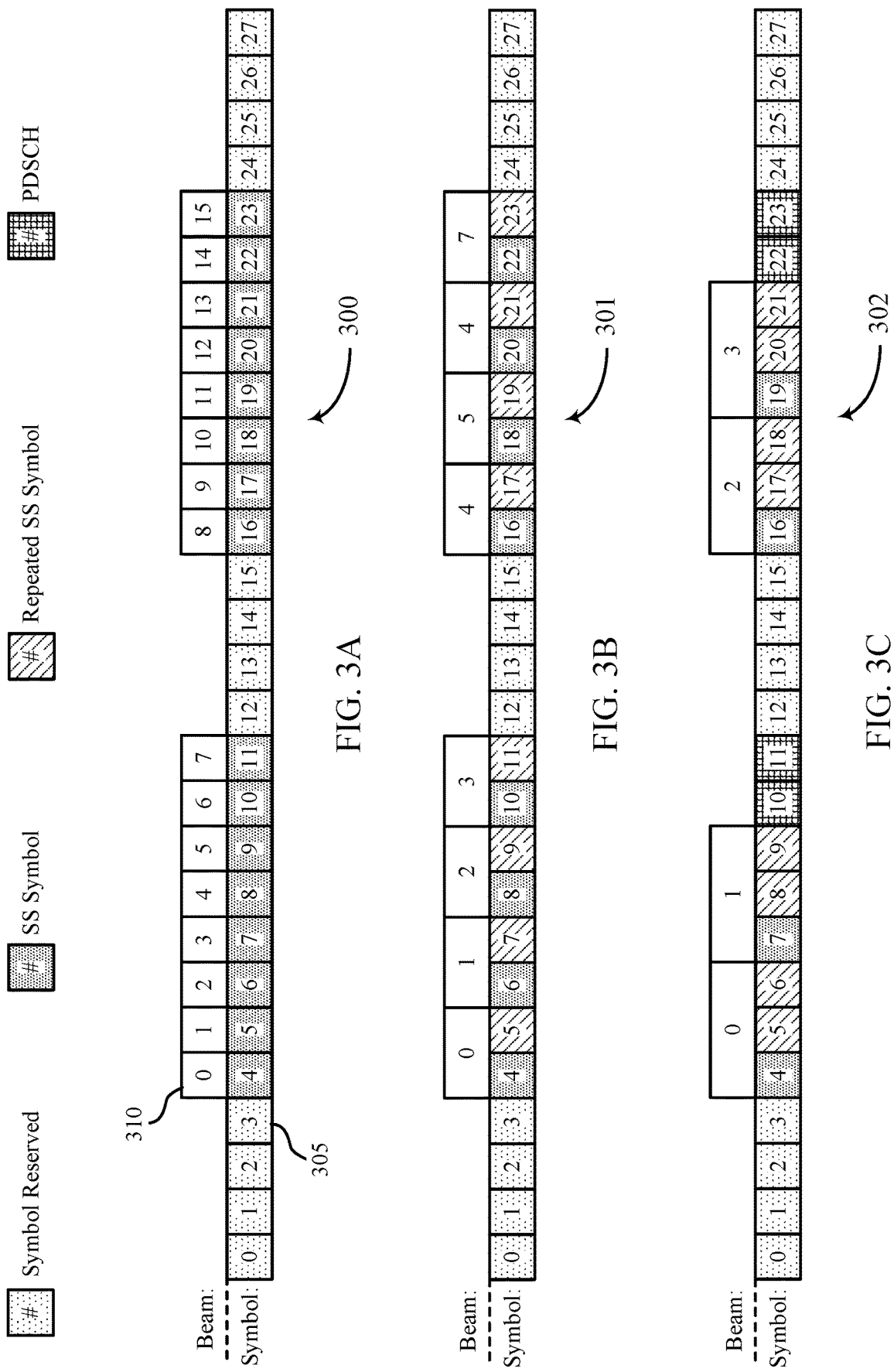
FIGS. 3A, 3B, and 3C illustrate example lean SSB signaling diagrams that support lean SSBs for reduced capability devices in accordance with aspects of the present disclosure.

FIG. 3A illustrates an example of a lean SSB signaling diagram 300 that supports lean SSBs for reduced capability devices in accordance with aspects of the present disclosure. In some examples, lean SSB signaling diagram 300 may implement aspects of wireless communications system 100 and/or wireless communications system 200. Lean SSB signaling diagram 300 may illustrate aspects of lean SSB signaling. For example, a lean SSB may be associated with a symbol index 305 (e.g., a 'Symbol' index 0-27) and a beam index 310 (e.g., a 'Beam' index 0-15). In the example of FIG. 3A, lean SSB signaling diagram 300 may illustrate configuration of an increased number of beams for lean SSB signaling, as a NBWP may support narrower beams for enhanced coverage (e.g., up to 64×4=256 beams may be supported due to the lean SSB 215 and the four symbol durations).

For example, as discussed herein, a lean SSB may maintain a 12 RB structure (e.g., in the frequency domain) with gaps on either side of the synchronization signal (SS) (e.g., on either side of the PSS or SSS). As lean SSBs may include a single symbol for the SS (the PSS or SSS of the lean SSB), the remaining three symbols (e.g., in total corresponding in time with four symbols of a generic SSB) may be used for more granular beam sweeping. As described herein, symbol start times of SSBs configured in a wireless communications system may be maintained for lean SSBs. For instance, for a 120 kHz SCS, lean SSB symbol start times may follow:

{4, 8, 16, 20}+28*n, where n=0, 1, 2, 3, 5, 6, 7, 8, 10, 11, 12, 13, 15, 16, 17, 18

However, due to the lean SSB spanning a single symbol, the remaining three symbols may be used to transmit lean SSBs using additional beams (e.g., where each beam used to transmit an SSB may be a narrow beam within a configured NBWP).

For instance, lean SSB signaling diagram 300 may illustrate lean SSB configuration where SS symbols (e.g., PSS symbols or SSS symbols) are transmitted according to SSB symbol start times corresponding to a wireless communications system employing a 120 kHz SCS. Each SS symbol may be transmitted with a narrow beam. In wireless communications system employing a 120 kHz SCS, SS symbols 4-7 may be transmitted using a first beam (e.g., a beam with beam index 0) and SS symbols 8-11 may be transmitted using a second beam (e.g., a beam with beam index 1), such that 64 beams may be supported for the SSB symbol start times discussed above. According to the techniques described herein, the remaining symbols of a lean SSB (e.g., or the remaining symbols of an SSB duration resulting from the lean SSB reduction) may be used such that, in the present example, 64×4=256 beams may be supported. Such support of additional beams may provide for more granular beams (e.g., for a NBWP) with may, in some cases, enhance coverage (e.g., as reduced capability UEs may use 256 beams for beam management procedures).

FIG. 3B illustrates an example of a lean SSB signaling diagram 301 that supports lean SSBs for reduced capability devices in accordance with aspects of the present disclosure. In some examples, lean SSB signaling diagram 301 may implement aspects of wireless communications system 100 and/or wireless communications system 200. Lean SSB signaling diagram 301 may illustrate aspects of lean SSB signaling. For example, a lean SSB may be associated with a symbol index 305 (e.g., a 'Symbol' index 0-27) and a beam index 310 (e.g., a 'Beam' index 0-7). In the example of FIG. 3B, lean SSB signaling diagram 301 may illustrate configuration of an increased number of beams for lean SSB signaling in addition to SS symbol repetition.

For example, lean SSB signaling diagram 301 may illustrate a configuration where two beams are configured per SSB duration (e.g., per four symbols, the four symbols starting at a starting symbol corresponding to configured SSBs within the given network configuration). Further, each beam may be associated with two instances per SS symbol (e.g., or a repeated SS symbol per beam). Such may provide for enhanced coverage as a SS symbol on each beam may be repeated and additional beams may be configured within the four symbols.

FIG. 3C illustrates an example of a lean SSB signaling diagram 302 that supports lean SSBs for reduced capability devices in accordance with aspects of the present disclosure. In some examples, lean SSB signaling diagram 302 may implement aspects of wireless communications system 100 and/or wireless communications system 200. Lean SSB signaling diagram 302 may illustrate aspects of lean SSB signaling. For example, a lean SSB may be associated with a symbol index 305 (e.g., a 'Symbol' index 0-27) and a beam index 310 (e.g., a 'Beam' index 0-3). In the example of FIG. 3C, lean SSB signaling diagram 302 may illustrate configuration of an increased number of beams for lean SSB signaling in addition to SS symbol repetition, as well as PDSCH signaling within the lean SSB (e.g., or along with the lean SSB within a four symbol duration corresponding to SSBs configured within a wireless communications system.

For example, lean SSB signaling diagram 302 may illustrate a configuration where two beams are configured per SSB duration (e.g., per four symbols, the four symbols starting at a starting symbol corresponding to configured SSBs within the given network configuration). Further, each beam may be associated with three instances (e.g., or three repetitions) of SS symbols. Such may provide for enhanced coverage as a SS symbol on each beam may be repeated and additional beams may be configured within the four symbols. Moreover, lean SSB signaling diagram 302 may illustrate configuration of PDSCH transmission within SSB durations. For example, for a 120 kHz SCS, both SSB and lean SSB symbol start times may follow:

{4, 8, 16, 20}+28*n, where n=0, 1, 2, 3, 5, 6, 7, 8, 10, 11, 12, 13, 15, 16, 17, 18 as described herein (e.g., to align symbol start times of SSBs and lean SSBs for time continuity between SSBs and lean SSBs, as described herein). Such starting symbol configuration may result in the reserved symbols 0-3, reserved symbols 12-15, reserved symbols 24-27, etc. (e.g., the examples of FIGS. 3A-3C are shown for illustrative purposes, and my extended through additional symbol indices through the example symbol start times exemplified above, without departing from the scope of the present disclosure).

As such, in the example symbol start time configuration exemplified above, an SSB burst may span 8 symbols. Lean SSB signaling diagram 302 may illustrate two lean SSBs transmitted in 6 symbols (e.g., where each lean SSB is configured a beam and with three SS symbol repetitions). Further, PDSCH transmission may follow the SS symbols in the remaining two symbols of an SSB duration. Various other lean SSB signaling configurations may be implemented using one or more aspects of the described techniques, by analogy, without departing from the scope of the present disclosure. For example, aspects of lean SSB signaling diagrams 300-302 may be combined, different numbers (e.g., 1-4) beams per SSB duration may be configured, different numbers (e.g., 1-4) of SS symbol repetitions may be configured per beam, PDSCH may be transmitted using additional or fewer symbols of SSB durations, PDSCH may be transmitted in different locations of a SSB duration, etc., based on the techniques described herein.

Figure 4:
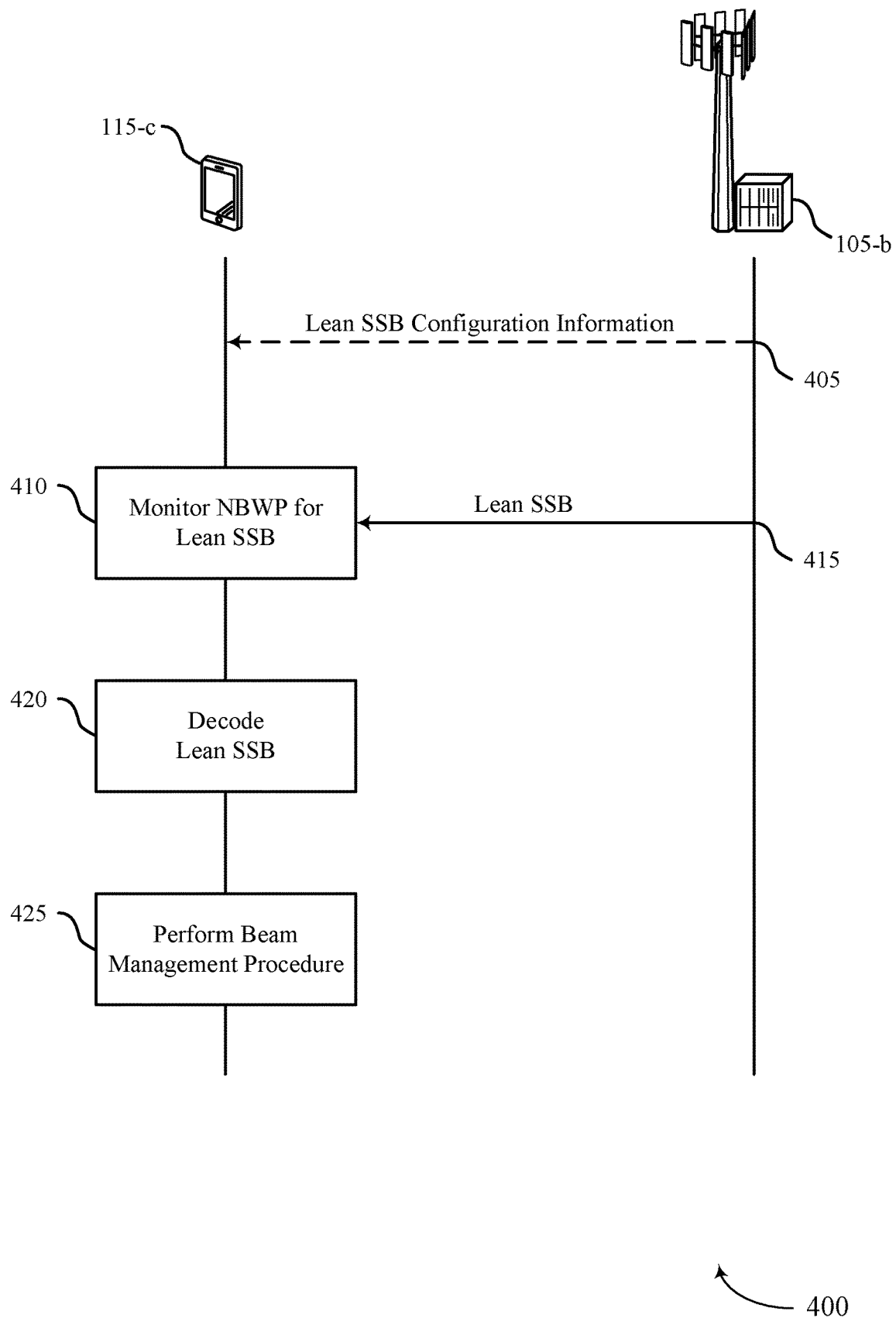
FIG. 4 illustrates an example of a process flow that supports lean SSBs for reduced capability devices in accordance with aspects of the present disclosure.

FIG. 4 illustrates an example of a process flow 400 that supports lean SSBs for reduced capability devices in accordance with aspects of the present disclosure. In some examples, process flow 400 may implement aspects of wireless communications system 100 and/or wireless communications system 200 and may be implemented by a UE 115-c and a base station 105-b, which may be examples of a UE 115 and a base station 105 described with reference to FIGS. 1-3. In some cases, UE 115-c may be an example of a reduced capability UE. Process flow 400 may also implement aspects of lean SSB signaling diagram 300, lean SSB signaling diagram 301, and/or lean SSB signaling diagram 302. In the following description of the process flow 400, the operations between UE 115-c and base station 105-b may be transmitted in a different order than the order shown, or the operations performed by base station 105-b and UE 115-c may be performed in different orders or at different times. Some operations may also be left out of the process flow 400, or other operations may be added to the process flow 400. It is to be understood that while base station 105-b and UE 115-c are shown performing a number of the operations of process flow 400, any wireless device may perform the operations shown.

At 405, in some examples, base station 105-b may transmit lean SSB configuration information to UE 115-c. For example, lean SSB configuration information may include an indication of whether a lean SSB includes a PSS or an SSS, an indication of a center frequency offset between lean SSBs and other SSBs configured within the wireless communications system, an indication of a parameter of a M-sequence for generation of synchronization signals of lean SSBs, various other parameters for configuration of lean SSBs (e.g., $N_{ID_{NB-BWP}}^{(2)}$), a generator function, etc. In some cases, the lean SSB configuration information may be transmitted via RRC signaling, a MAC CE, DCI, etc.

In some examples, UE 115-c may, for initial acquisition, monitor the second bandwidth region for the second synchronization block. In such cases, for the initial acquisition procedure, UE 115-c may decode the second synchronization block based on monitoring the second bandwidth region to obtain PCI, time alignment etc. After initial acquisition, UE 115-c may monitor the first bandwidth region (e.g., a configured NBWP) for the first synchronization block based on decoding the second synchronization block and the capability of the UE 115-c (e.g., UE 115-c may reduce bandwidth and monitor for lean SSBs, such as the first synchronization block, based completing initial acquisition).

In some cases, at 405, base station 105-b may transmit a TCI state indicating a QCL relationship for lean SSBs (e.g., including the first synchronization block). For example, QCL relationship for lean SSBs that may be indicated or configured by base station 105-b may include one or more of a SSB and lean SSB QCL relationship, a lean SSB and TRS QCL relationship, a lean SSB and CSI-RS (for beamforming) QCL relationship, a lean SSB and CSI-RS (for channel state information) QCL relationship, a lean SSB and DMRS (for downlink control channel) QCL relationship, or a lean SSB and DMRS (for downlink shared channel) QCL relationship.

At 410, UE 115-c may monitor a first bandwidth region (e.g., a NBWP) for a first synchronization block (e.g., a lean SSB) based on a capability of the UE 115-c. As discussed herein, the first synchronization block (e.g., the lean SSB) may include a subset of signals (e.g., one of either a PSS or an SSS) of a second synchronization block (e.g., an SSB) associated with a second bandwidth region (e.g., a BWP). That is, the first synchronization block may include a subset of the PSS, SSS, and PBCH of the second synchronization block (e.g., the subset including one of either a PSS or an SSS).

In some cases, UE 115-c may identify a first center frequency corresponding to the first synchronization block, where the first bandwidth region may be monitored for the first synchronization block based on the identified first center frequency (e.g., where the first center frequency is different from a second center frequency corresponding to the second synchronization block). In some cases, UE 115-c may identify a first M-sequence associated with the first synchronization block (e.g., $N_{ID_{NB-BWP}}^{(2)}$), where the first synchronization block is decoded based on the identified first M-sequence. As described herein, in some cases, UE 115-c may identify a second M-sequence associated with the second synchronization block (e.g., $N_{ID}^{(2)}$), and the UE 115-c may identify a parameter of the second M-sequence (e.g., $\delta$), where the first M-sequence (e.g., $N_{ID_{NB-BWP}}^{(2)}$) is identified based on the identified second M-sequence and the identified parameter. As discussed herein, the first M-sequence, the second M-sequence, the parameter of the second M-sequence, etc. may be preconfigured, may be transmitted to the UE 115-c at 405, etc.

At 415, base station 105-b may transmit one or more lean SSBs, including the first synchronization block, (e.g., which may be preconfigured or which may be based on lean SSB configuration information transmitted at 405). For example, base station 105-b may transmit a lean SSB in accordance with the techniques described herein (e.g., where the lean SSB may be transmitted at a different center frequency than SSBs or at same starting symbols as other SSBs).

At 420, UE 115-c may decode the first synchronization block based on monitoring the first bandwidth region (e.g., the UE 115-c may decode a lean SSB based on monitoring a configured NBWP). In some cases, the first synchronization block and the subset of signals in the second synchronization block may be associated with a same resource block structure. In some cases, the first synchronization block and the subset of signals in the second synchronization block may be associated with a same symbol start time and a same symbol gap (e.g., SSB and lean SSBs may be associated with a same symbol start time and a same symbol gap, as described herein with reference to 120 kHz SCS examples). In some cases, UE 115-c may decode the first synchronization block based on a QCL relationship received at 405.

In some examples, the first synchronization block includes one or more repetitions of the subset of signals in the second synchronization block (e.g., as described herein with reference to, for example, repeated SS symbols of lean SSB signaling diagrams 301 and 302). In some examples, the first synchronization block is associated with one or more additional beams than the subset of signals in the second synchronization block (e.g., as described herein with reference to, for example, SS symbols and beam indices of lean SSB signaling diagrams 300-303). In some examples, the first synchronization block includes downlink shared channel data in addition to the subset of signals in the second synchronization block (e.g., as described herein with reference to, for example, PDSCH of lean SSB signaling diagrams 303).

At 425, UE 115-c may perform a beam management procedure based on decoding the first synchronization block. For example, UE 115-c may perform such beam management procedures to receive one or more downlink transmissions (e.g., PDCCH and/or PDSCH transmissions) at time(s) and/or frequencies indicated or calibrated by the estimated timing and frequency from the first synchronization block. UE 115-c may use the first synchronization block for beam tracking, beam management, frequency tracking, time tracking, etc., as described herein. For instance, UE 115-c may use the first synchronization block to perform one or more RRM measurements.

Figure 5:
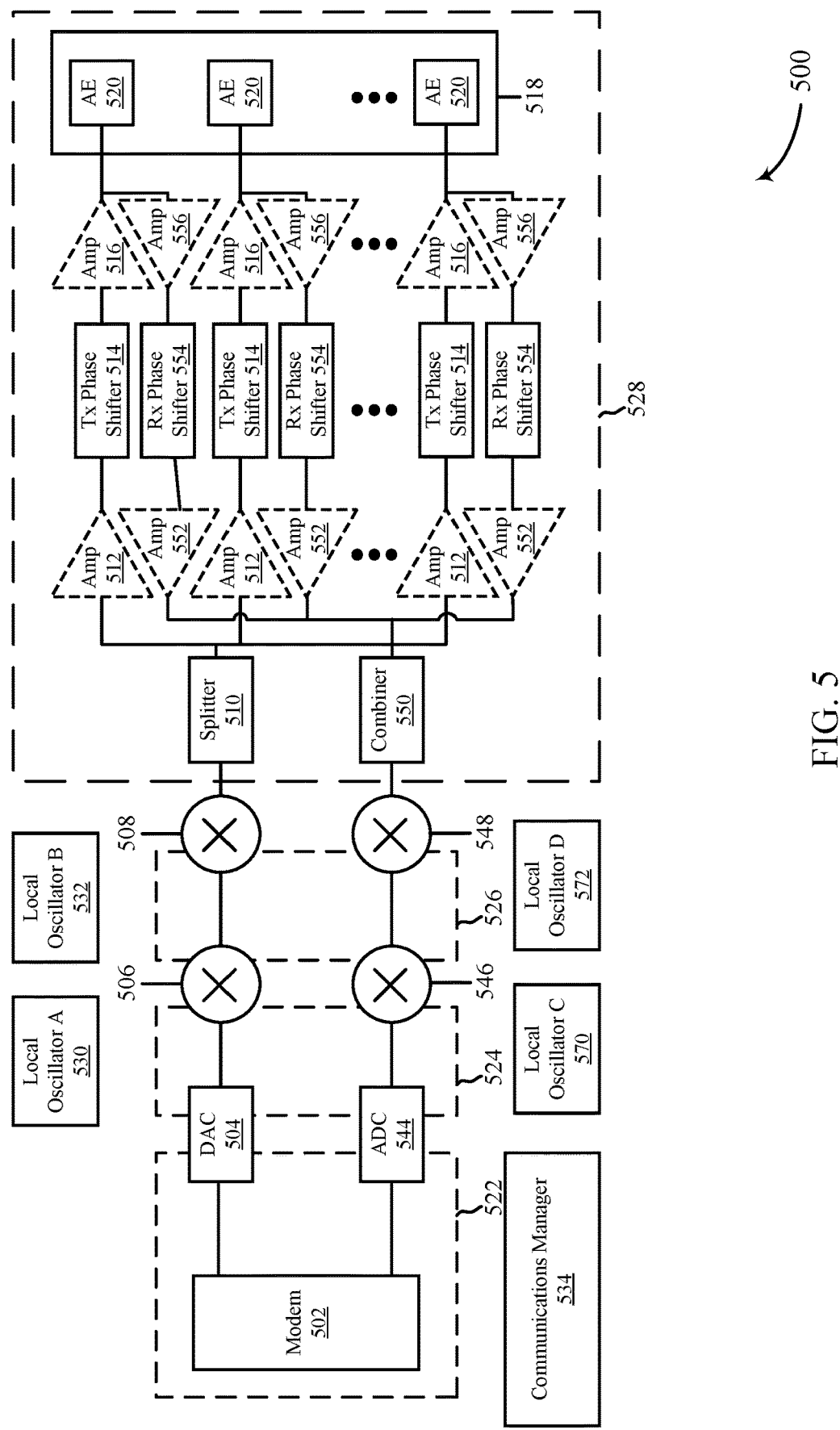
FIG. 5 illustrates an example of an architecture that supports lean SSBs for reduced capability devices in accordance with aspects of the present disclosure.

FIG. 5 illustrates an example of architecture 500 that supports determining sub-dominant clusters in a mmW channel in accordance with aspects of the present disclosure. In some examples, architecture 500 may implement aspects of wireless communications systems 100, wireless communications system 200, any of lean SSB signaling diagrams 300-302, and/or process flow 400. In some aspects, architecture 500 may be an example of the transmitting device (e.g., a first wireless device) and/or a receiving device (e.g., a second wireless device) as described herein.

Broadly, FIG. 5 is a diagram illustrating example hardware components of a wireless device in accordance with some aspects of the disclosure. The illustrated components may include those that may be used for antenna element selection and/or for beamforming for transmission of wireless signals. There are numerous architectures for antenna element selection and implementing phase shifting, one example of which is illustrated here. The architecture 500 includes a modem (modulator/demodulator) 502, a digital to analog converter (DAC) 504, a first mixer 506, a second mixer 508, and a splitter 510. The architecture 500 also includes a set of first amplifiers 512, a set of phase shifters 514, a set of second amplifiers 516, and an antenna array 518 that includes a set of antenna elements 520. Transmission lines or other waveguides, wires, traces, or the like are shown connecting the various components to illustrate how signals to be transmitted may travel between components. Boxes 522, 524, 526, and 528 indicate regions in the architecture 500 in which different types of signals travel or are processed. Specifically, box 522 indicates a region in which digital baseband signals travel or are processed, box 524 indicates a region in which analog baseband signals travel or are processed, box 526 indicates a region in which analog intermediate frequency (IF) signals travel or are processed, and box 528 indicates a region in which analog radio frequency (RF) signals travel or are processed. The architecture also includes a local oscillator A 530, a local oscillator B 532, and a communications manager 534.

Each of the antenna elements 520 may include one or more sub-elements (not shown) for radiating or receiving RF signals. For example, a single antenna element 520 may include a first sub-element cross-polarized with a second sub-element that can be used to independently transmit cross-polarized signals. The antenna elements 520 may include patch antennas or other types of antennas arranged in a linear, two dimensional, or other pattern. A spacing between antenna elements 520 may be such that signals with a desired wavelength transmitted separately by the antenna elements 520 may interact or interfere (e.g., to form a desired beam). For example, given an expected range of wavelengths or frequencies, the spacing may provide a quarter wavelength, half wavelength, or other fraction of a wavelength of spacing between neighboring antenna elements 520 to allow for interaction or interference of signals transmitted by the separate antenna elements 520 within that expected range.

The modem 502 processes and generates digital baseband signals and may also control operation of the DAC 504, first and second mixers 506, 508, splitter 510, first amplifiers 512, phase shifters 514, and/or the second amplifiers 516 to transmit signals via one or more or all of the antenna elements 520. The modem 502 may process signals and control operation in accordance with a communication standard such as a wireless standard discussed herein. The DAC 504 may convert digital baseband signals received from the modem 502 (and that are to be transmitted) into analog baseband signals. The first mixer 506 upconverts analog baseband signals to analog IF signals within an IF using a local oscillator A 530. For example, the first mixer 506 may mix the signals with an oscillating signal generated by the local oscillator A 530 to "move" the baseband analog signals to the IF. In some cases, some processing or filtering (not shown) may take place at the IF. The second mixer 508 upconverts the analog IF signals to analog RF signals using the local oscillator B 532. Similarly to the first mixer, the second mixer 508 may mix the signals with an oscillating signal generated by the local oscillator B 532 to "move" the IF analog signals to the RF, or the frequency at which signals will be transmitted or received. The modem 502 and/or the communications manager 534 may adjust the frequency of local oscillator A 530 and/or the local oscillator B 532 so that a desired IF and/or RF frequency is produced and used to facilitate processing and transmission of a signal within a desired bandwidth.

In the illustrated architecture 500, signals upconverted by the second mixer 508 are split or duplicated into multiple signals by the splitter 510. The splitter 510 in architecture 500 splits the RF signal into a set of identical or nearly identical RF signals, as denoted by its presence in box 528. In other examples, the split may take place with any type of signal including with baseband digital, baseband analog, or IF analog signals. Each of these signals may correspond to an antenna element 520 and the signal travels through and is processed by amplifiers 512, 516, phase shifters 514, and/or other elements corresponding to the respective antenna element 520 to be provided to and transmitted by the corresponding antenna element 520 of the antenna array 518. In one example, the splitter 510 may be an active splitter that is connected to a power supply and provides some gain so that RF signals exiting the splitter 510 are at a power level equal to or greater than the signal entering the splitter 510. In another example, the splitter 510 is a passive splitter that is not connected to power supply and the RF signals exiting the splitter 510 may be at a power level lower than the RF signal entering the splitter 510.

After being split by the splitter 510, the resulting RF signals may enter an amplifier, such as a first amplifier 512, or a phase shifter 514 corresponding to an antenna element 520. The first and second amplifiers 512, 516 are illustrated with dashed lines because one or both of them might not be necessary in some implementations. In one implementation, both the first amplifier 512 and second amplifier 516 are present. In another, neither the first amplifier 512 nor the second amplifier 516 is present. In other implementations, one of the two amplifiers 512, 516 is present but not the other. By way of example, if the splitter 510 is an active splitter, the first amplifier 512 may not be used. By way of further example, if the phase shifter 514 is an active phase shifter that can provide a gain, the second amplifier 516 might not be used. The amplifiers 512, 516 may provide a desired level of positive or negative gain. A positive gain (positive dB) may be used to increase an amplitude of a signal for radiation by a specific antenna element 520. A negative gain (negative dB) may be used to decrease an amplitude and/or suppress radiation of the signal by a specific antenna element. Each of the amplifiers 512, 516 may be controlled independently (e.g., by the modem 502 or communications manager 534) to provide independent control of the gain for each antenna element 520. For example, the modem 502 and/or the communications manager 534 may have at least one control line connected to each of the splitter 510, first amplifiers 512, phase shifters 514, and/or second amplifiers 516 which may be used to configure a gain to provide a desired amount of gain for each component and thus each antenna element 520.

The phase shifter 514 may provide a configurable phase shift or phase offset to a corresponding RF signal to be transmitted. The phase shifter 514 could be a passive phase shifter not directly connected to a power supply. Passive phase shifters might introduce some insertion loss. The second amplifier 516 could boost the signal to compensate for the insertion loss. The phase shifter 514 could be an active phase shifter connected to a power supply such that the active phase shifter provides some amount of gain or prevents insertion loss. The settings of each of the phase shifters 514 are independent meaning that each can be set to provide a desired amount of phase shift or the same amount of phase shift or some other configuration. The modem 502 and/or the communications manager 534 may have at least one control line connected to each of the phase shifters 514 and which may be used to configure the phase shifters 514 to provide a desired amounts of phase shift or phase offset between antenna elements 520.

In the illustrated architecture 500, RF signals received by the antenna elements 520 are provided to one or more of first amplifier 556 to boost the signal strength. The first amplifier 556 may be connected to the same antenna arrays 515, e.g., for TDD operations. The first amplifier 556 may be connected to different antenna arrays 515. The boosted RF signal is input into one or more of phase shifter 554 to provide a configurable phase shift or phase offset for the corresponding received RF signal. The phase shifter 554 may be an active phase shifter or a passive phase shifter. The settings of the phase shifters 554 are independent, meaning that each can be set to provide a desired amount of phase shift or the same amount of phase shift or some other configuration. The modem 502 and/or the communications manager 534 may have at least one control line connected to each of the phase shifters 554 and which may be used to configure the phase shifters 554 to provide a desired amount of phase shift or phase offset between antenna elements 520.

The outputs of the phase shifters 554 may be input to one or more second amplifiers 552 for signal amplification of the phase shifted received RF signals. The second amplifiers 552 may be individually configured to provide a configured amount of gain. The second amplifiers 552 may be individually configured to provide an amount of gain to ensure that the signal input to combiner 550 have the same magnitude. The amplifiers 552 and/or 556 are illustrated in dashed lines because they might not be necessary in some implementations. In one implementation, both the amplifier 552 and the amplifier 556 are present. In another, neither the amplifier 552 nor the amplifier 556 are present. In other implementations, one of the amplifiers 552, 556 is present but not the other.

In the illustrated architecture 500, signals output by the phase shifters 554 (via the amplifiers 552 when present) are combined in combiner 550. The combiner 550 in architecture combines the RF signal into a signal, as denoted by its presence in box 525. The combiner 550 may be a passive combiner, e.g., not connected to a power source, which may result in some insertion loss. The combiner 550 may be an active combiner, e.g., connected to a power source, which may result in some signal gain. When combiner 550 is an active combiner, it may provide a different (e.g., configurable) amount of gain for each input signal so that the input signals have the same magnitude when they are combined. When combiner 550 is an active combiner, it may not need the second amplifier 552 because the active combiner may provide the signal amplification.

The output of the combiner 550 is input into mixers 548 and 546. Mixers 548 and 546 generally down convert the received RF signal using inputs from local oscillators 572 and 570, respectively, to create intermediate or baseband signals that carry the encoded and modulated information. The output of the mixers 548 and 546 are input into an analog-to-digital converter (ADC) 544 for conversion to analog signals. The analog signals output from ADC 544 is input to modem 502 for baseband processing, e.g., decoding, de-interleaving, etc.

The architecture 500 is given by way of example to illustrate an architecture for transmitting and/or receiving signals. It will be understood that the architecture 500 and/or each portion of the architecture 500 may be repeated multiple times within an architecture to accommodate or provide an arbitrary number of RF chains, antenna elements, and/or antenna panels. Furthermore, numerous alternate architectures are possible and contemplated. For example, although a single antenna array 518 is shown, two, three, or more antenna arrays may be included each with one or more of their own corresponding amplifiers, phase shifters, splitters, mixers, DACs, ADCs, and/or modems. For example, a single UE may include two, four or more antenna arrays for transmitting or receiving signals at different physical locations on the UE or in different directions.

Furthermore, mixers, splitters, amplifiers, phase shifters and other components may be located in different signal type areas (e.g., different ones of the boxes 522, 524, 526, 528) in different implemented architectures. For example, a split of the signal to be transmitted into a set of signals may take place at the analog RF, analog IF, analog baseband, or digital baseband frequencies in different examples. Similarly, amplification, and/or phase shifts may also take place at different frequencies. For example, in some contemplated implementations, one or more of the splitter 510, amplifiers 512, 516, or phase shifters 514 may be located between the DAC 504 and the first mixer 506 or between the first mixer 506 and the second mixer 508. In one example, the functions of one or more of the components may be combined into one component. For example, the phase shifters 514 may perform amplification to include or replace the first and/or or second amplifiers 512, 516. By way of another example, a phase shift may be implemented by the second mixer 508 to obviate the need for a separate phase shifter 514. This technique is sometimes called local oscillator phase shifting. In one implementation of this configuration, there may be a set of IF to RF mixers (e.g., for each antenna element chain) within the second mixer 508 and the local oscillator B 532 would supply different local oscillator signals (with different phase offsets) to each IF to RF mixer.

The modem 502 and/or the communications manager 534 may control one or more of the other components 504-572 to select one or more antenna elements 520 and/or to form beams for transmission of one or more signals. For example, the antenna elements 520 may be individually selected or deselected for transmission of a signal (or signals) by controlling an amplitude of one or more corresponding amplifiers, such as the first amplifiers 512 and/or the second amplifiers 516. Beamforming includes generation of a beam using a set of signals on different antenna elements where one or more or all of the set signals are shifted in phase relative to each other. The formed beam may carry physical or higher layer reference signals or information. As each signal of the set of signals is radiated from a respective antenna element 520, the radiated signals interact, interfere (constructive and destructive interference), and amplify each other to form a resulting beam. The shape (such as the amplitude, width, and/or presence of side lobes) and the direction (such as an angle of the beam relative to a surface of the antenna array 518) can be dynamically controlled by modifying the phase shifts or phase offsets imparted by the phase shifters 514 and amplitudes imparted by the amplifiers 512, 516 of the set of signals relative to each other.

The communications manager 534 may, when architecture 500 is configured as a transmitting device, determine a spatial separation distance between at least two transmitting entities or at least two receiving entities, determine a rank associated with a beam direction based on the spatial separation distance for the at least two transmitting entities or the at least two receiving entities, and transmit at least two uncorrelated signals over the beam direction based on the rank associated with the beam direction, as discussed herein. The communications manager 534 may, when architecture 500 is configured as a receiving device, transmit an indication of a beam direction and a rank associated with the beam direction and receive at least one signal over the beam direction based on the rank associated with the beam direction. The communications manager 534 may, when architecture 500 is configured as a receiving device, receive an indication of a beam direction and a rank associated with the beam direction and receive at least two uncorrelated signals over the beam direction based on the rank associated with the beam direction. The communications manager 534 may be located partially or fully within one or more other components of the architecture 500. For example, the communications manager 534 may be located within the modem 502 in at least one implementation.

Figure 6:
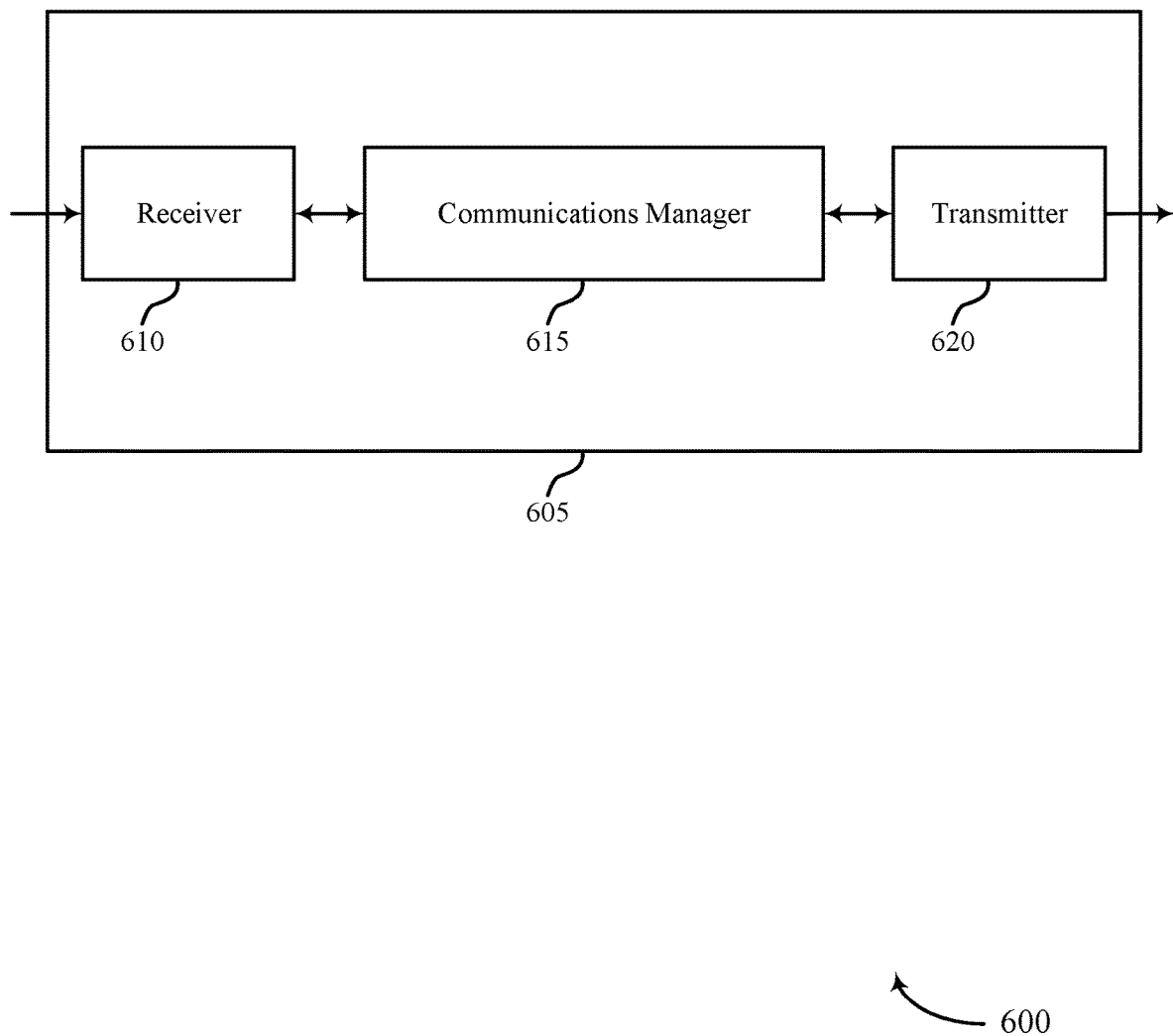
FIGS. 6 and 7 show block diagrams of devices that support lean SSBs for reduced capability devices in accordance with aspects of the present disclosure.

FIG. 6 shows a block diagram 600 of a device 605 that supports lean SSBs for reduced capability devices in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to lean SSBs for reduced capability devices). Information may be passed on to other components of the device 605. The receiver 610 may be an example of aspects of the transceiver 920 described with reference to FIG. 9. The receiver 610 may utilize a single antenna or a set of antennas.

The communications manager 615 may monitor a first bandwidth region for a first synchronization block based on a capability of the UE, where the first synchronization block includes a subset of signals in a second synchronization block associated with a second bandwidth region, decode the first synchronization block based on monitoring the first bandwidth region, and perform a radio resource management measurement based on decoding the first synchronization block. The communications manager 615 may be an example of aspects of the communications manager 910 described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a DSP, an application-specific integrated circuit (ASIC), a field programmable gate array (FPGA) or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

By including or configuring the communications manager 615 in accordance with examples as described herein, the device 605 (e.g., a processor controlling or otherwise coupled to the receiver 610, the transmitter 620, the communications manager 615, or any combination thereof) may support techniques for reduced power consumption and increased efficiency. For example, by reducing its operating bandwidth otherwise associated with SSBs used for beam management procedures and by avoiding decoding computations associated with a PBCH, the device 605 may conserve power and reduce bandwidth.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

Figure 7:
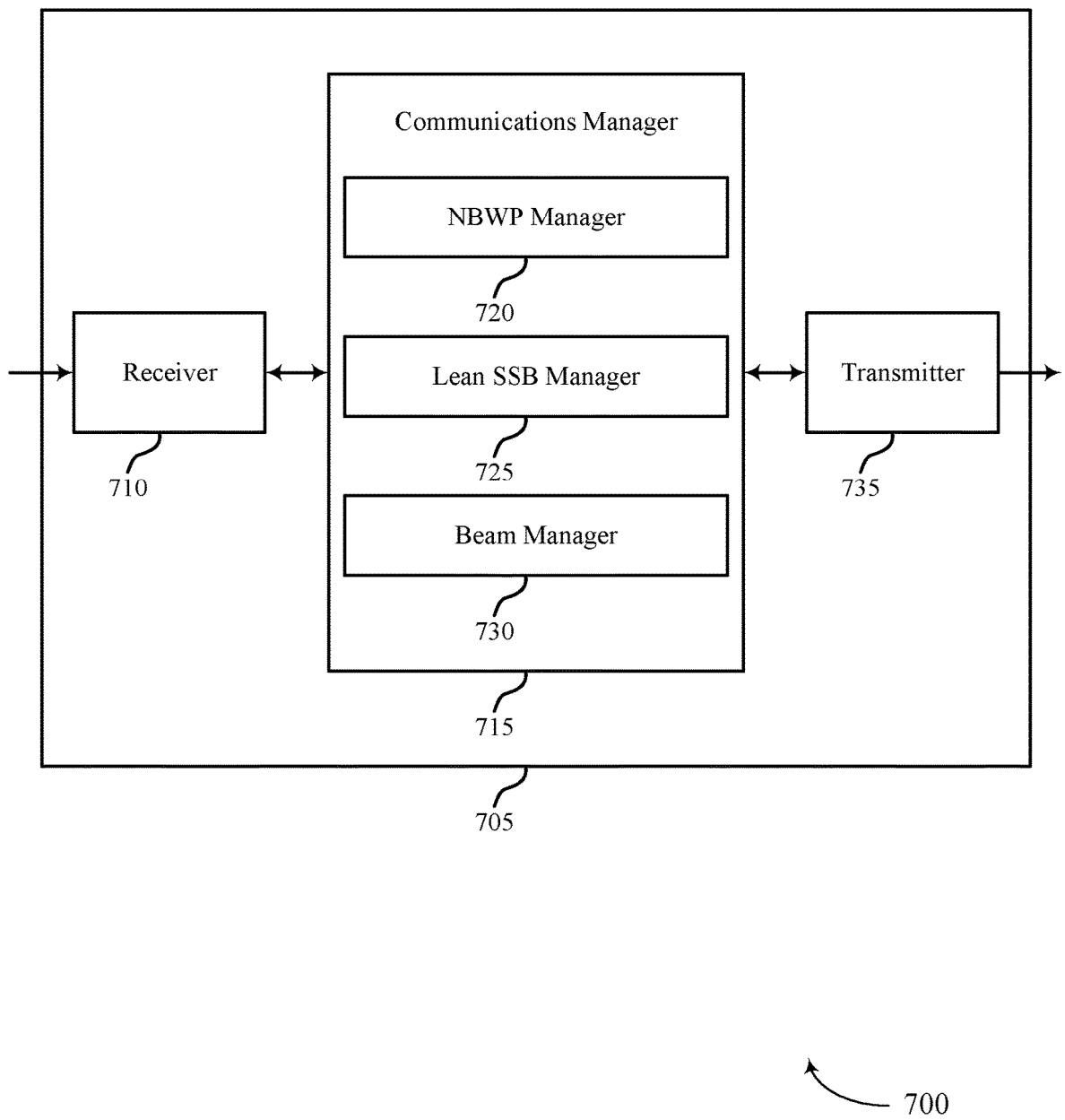

FIG. 7 shows a block diagram 700 of a device 705 that supports lean SSBs for reduced capability devices in accordance with aspects of the present disclosure. The device 705 may be an example of aspects of a device 605, or a UE 115 as described herein. The device 705 may include a receiver 710, a communications manager 715, and a transmitter 735. The device 705 may also include a processor. Each of these components may be in communication with one another (e.g., via one or more buses).

The receiver 710 may receive information such as packets, user data, or control information associated with various information channels (e.g., control channels, data channels, and information related to lean SSBs for reduced capability devices). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a NBWP manager 720, a lean SSB manager 725, and a beam manager 730. The communications manager 715 may be an example of aspects of the communications manager 910 described herein.

The NBWP manager 720 may monitor a first bandwidth region for a first synchronization block based on a capability of the UE, where the first synchronization block includes a subset of signals in a second synchronization block associated with a second bandwidth region.

The lean SSB manager 725 may decode the first synchronization block based on monitoring the first bandwidth region. In some examples, the beam manager 730 may perform a radio resource management measurement based on decoding the first synchronization block.

The transmitter 735 may transmit signals generated by other components of the device 705. In some examples, the transmitter 735 may be collocated with a receiver 710 in a transceiver module. For example, the transmitter 735 may be an example of aspects of the transceiver 920 described with reference to FIG. 9. The transmitter 735 may utilize a single antenna or a set of antennas.

Figure 8:
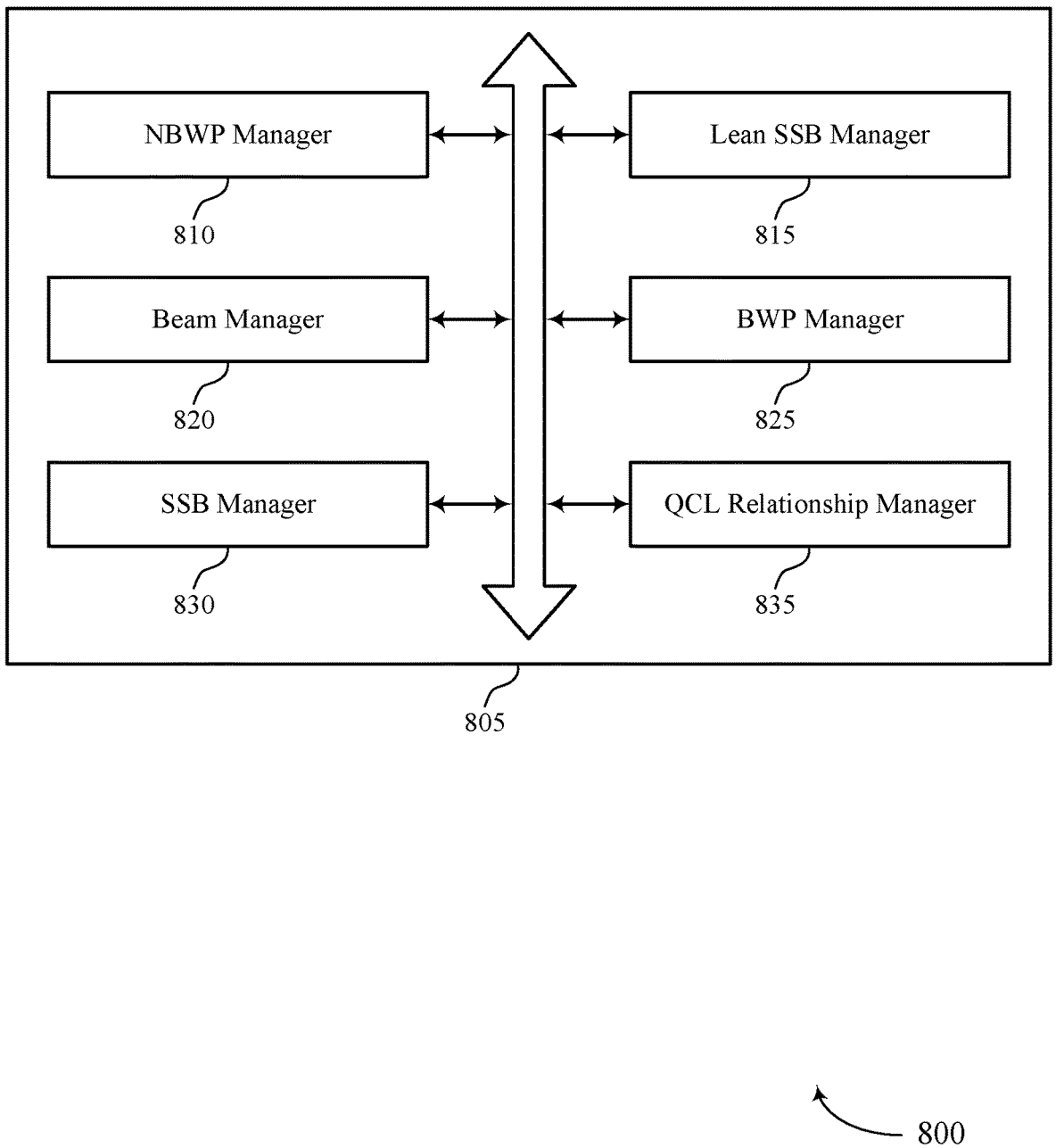
FIG. 8 shows a block diagram of a communications manager that supports lean SSBs for reduced capability devices in accordance with aspects of the present disclosure.

FIG. 8 shows a block diagram 800 of a communications manager 805 that supports lean SSBs for reduced capability devices in accordance with aspects of the present disclosure. The communications manager 805 may be an example of aspects of a communications manager 615, a communications manager 715, or a communications manager 910 described herein. The communications manager 805 may include a NBWP manager 810, a lean SSB manager 815, a beam manager 820, a BWP manager 825, an SSB manager 830, and a QCL relationship manager 835. Each of these modules may communicate, directly or indirectly, with one another (e.g., via one or more buses).

The NBWP manager 810 may monitor a first bandwidth region for a first synchronization block based on a capability of the UE, where the first synchronization block includes a subset of signals in a second synchronization block associated with a second bandwidth region.

In some examples, monitoring the first bandwidth region for an SSS, where the second synchronization block includes a PSS, the SSS, and a PBCH.

In some examples, monitoring the first bandwidth region for a PSS, where the second synchronization block includes the PSS, a SSS, and a PBCH. In some cases, the capability of the UE includes a UE bandwidth reduction capability.

The lean SSB manager 815 may decode the first synchronization block based on monitoring the first bandwidth region. In some examples, the lean SSB manager 815 may identify a first center frequency corresponding to the first synchronization block, where the first bandwidth region is monitored for the first synchronization block based on the identified first center frequency.

In some examples, the lean SSB manager 815 may identify a first M-sequence associated with the first synchronization block, where the first synchronization block is decoded based on the identified first M-sequence. In some examples, the lean SSB manager 815 may identify a second M-sequence associated with the second synchronization block.

In some examples, the lean SSB manager 815 may identify a parameter of the second M-sequence, where the first M-sequence is identified based on the identified second M-sequence and the identified parameter. In some examples, the lean SSB manager 815 may receive an indication of the parameter, where the parameter is identified based on the received indication.

In some cases, the first center frequency is different from a second center frequency corresponding to the second synchronization block. In some cases, the first synchronization block and the subset of signals in the second synchronization block are associated with a same resource block structure.

In some cases, the first synchronization block and the subset of signals in the second synchronization block are associated with a same symbol start time and a same symbol gap. In some cases, the first synchronization block includes one or more repetitions of the subset of signals in the second synchronization block. In some cases, the first synchronization block is associated with one or more additional beams than the subset of signals in the second synchronization block. In some cases, the first synchronization block includes downlink shared channel data in addition to the subset of signals in the second synchronization block.

The beam manager 820 may perform a radio resource management measurement based on decoding the first synchronization block. In some examples, the beam manager 820 may perform one or more of a beam tracking update, a frequency tracking update, or a time tracking update based on the first synchronization block. The BWP manager 825 may monitor the second bandwidth region for the second synchronization block based on an initial acquisition procedure.

The SSB manager 830 may decode the second synchronization block based on monitoring the second bandwidth region, where the UE monitors the first bandwidth region for the first synchronization block based on decoding the second synchronization block and the capability of the UE.

The QCL relationship manager 835 may receive a TCI state indicating a QCL relationship, where the first synchronization block is decoded based on the QCL relationship.

In some cases, the QCL relationship includes one or more of a second synchronization block and first synchronization block QCL relationship, a first synchronization block and tracking reference signal QCL relationship, a first synchronization block and CSI-RS for beamforming QCL relationship, a first synchronization block and CSI-RS for channel state information QCL relationship, a first synchronization block and DMRS for downlink control channel QCL relationship, or a first synchronization block and DMRS for downlink shared channel QCL relationship.

Figure 9:
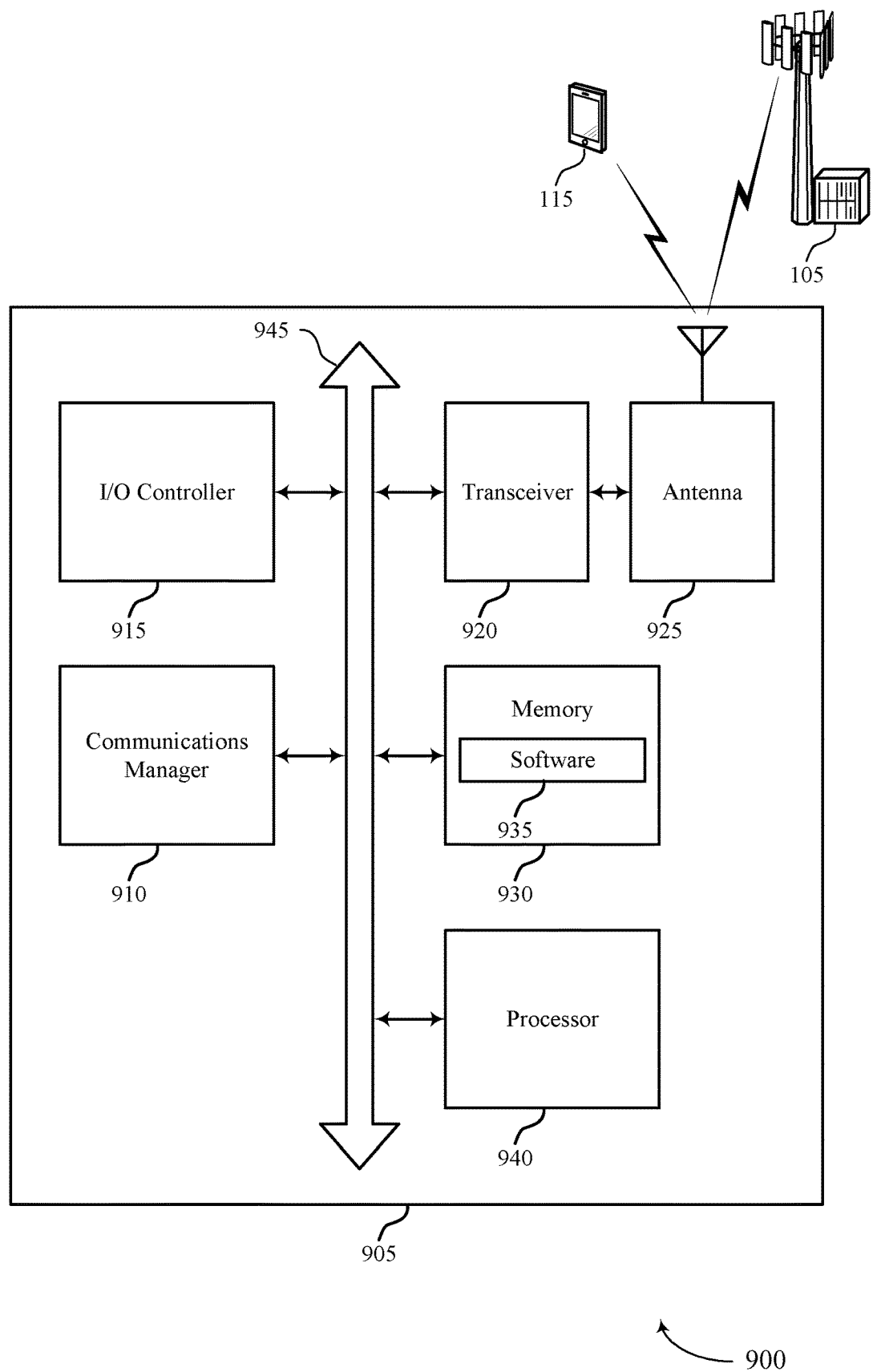
FIG. 9 shows a diagram of a system including a device that supports lean SSBs for reduced capability devices in accordance with aspects of the present disclosure.

FIG. 9 shows a diagram of a system 900 including a device 905 that supports lean SSBs for reduced capability devices in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may monitor a first bandwidth region for a first synchronization block based on a capability of the UE, where the first synchronization block includes a subset of signals in a second synchronization block associated with a second bandwidth region, decode the first synchronization block based on monitoring the first bandwidth region, and perform a radio resource management measurement based on decoding the first synchronization block.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include random-access memory (RAM) and read-only memory (ROM). The memory 930 may store computer-readable, computer-executable code or software 935 including instructions that, when executed, cause the processor to perform various functions described herein. In some cases, the memory 930 may contain, among other things, a basic input/output system (BIOS) which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting lean SSBs for reduced capability devices).

The software 935 may include instructions to implement aspects of the present disclosure, including instructions to support wireless communications. The software 935 may be stored in a non-transitory computer-readable medium such as system memory or other type of memory. In some cases, the software 935 may not be directly executable by the processor 940 but may cause a computer (e.g., when compiled and executed) to perform functions described herein.

Figure 10:
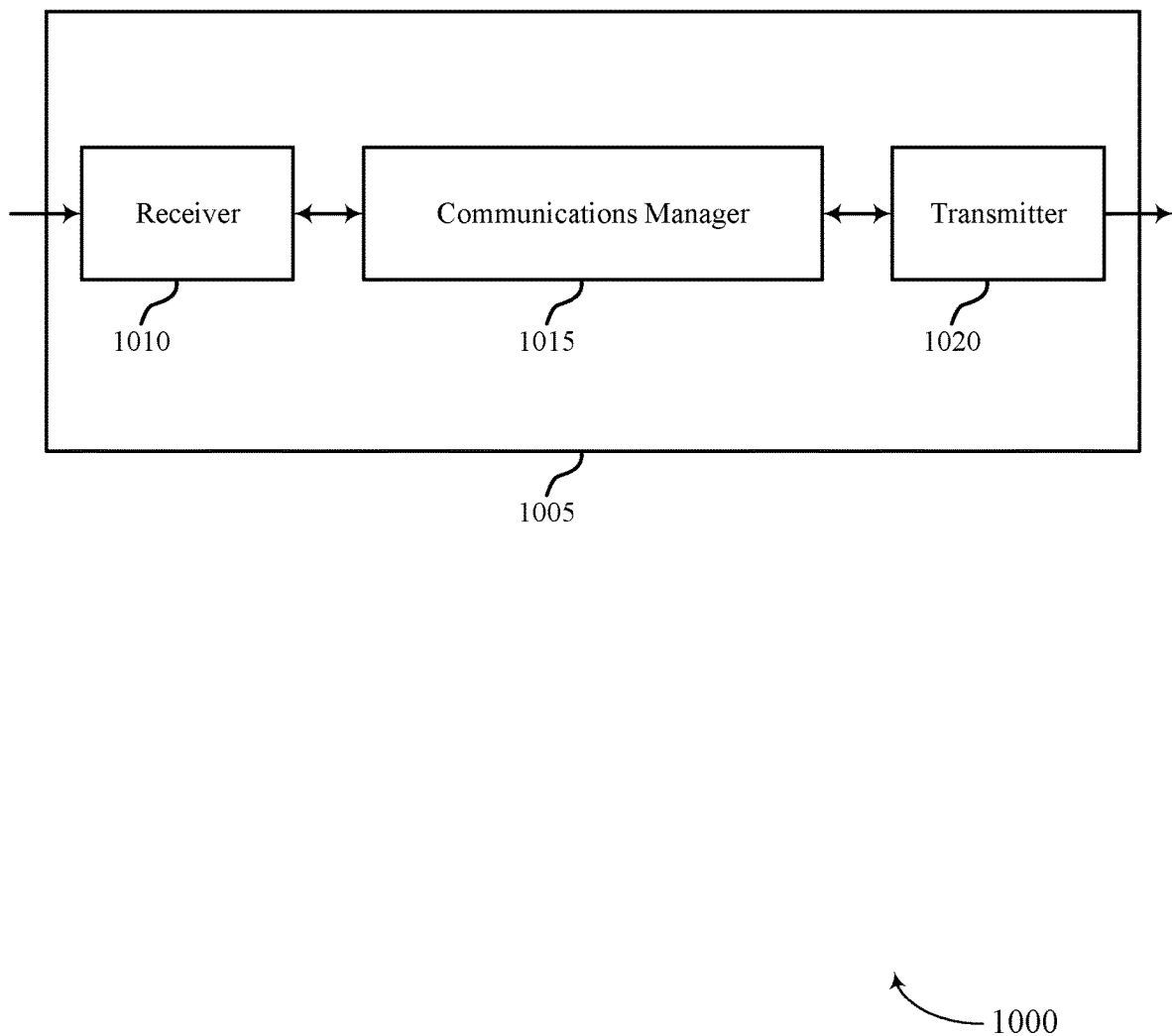
FIGS. 10 and 11 show block diagrams of devices that support lean SSBs for reduced capability devices in accordance with aspects of the present disclosure.

FIG. 10 shows a block diagram 1000 of a device 1005 that supports lean SSBs for reduced capability devices in accordance with aspects of the present disclosure. The device 1005 may be an example of aspects of a base station 105 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to lean SSBs for reduced capability devices). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may transmit a second synchronization block in a second bandwidth region and transmit a first synchronization block in a first bandwidth region based on a beam management procedure, where the first synchronization block includes a subset of signals in the second synchronization block. The communications manager 1015 may be an example of aspects of the communications manager 1310 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
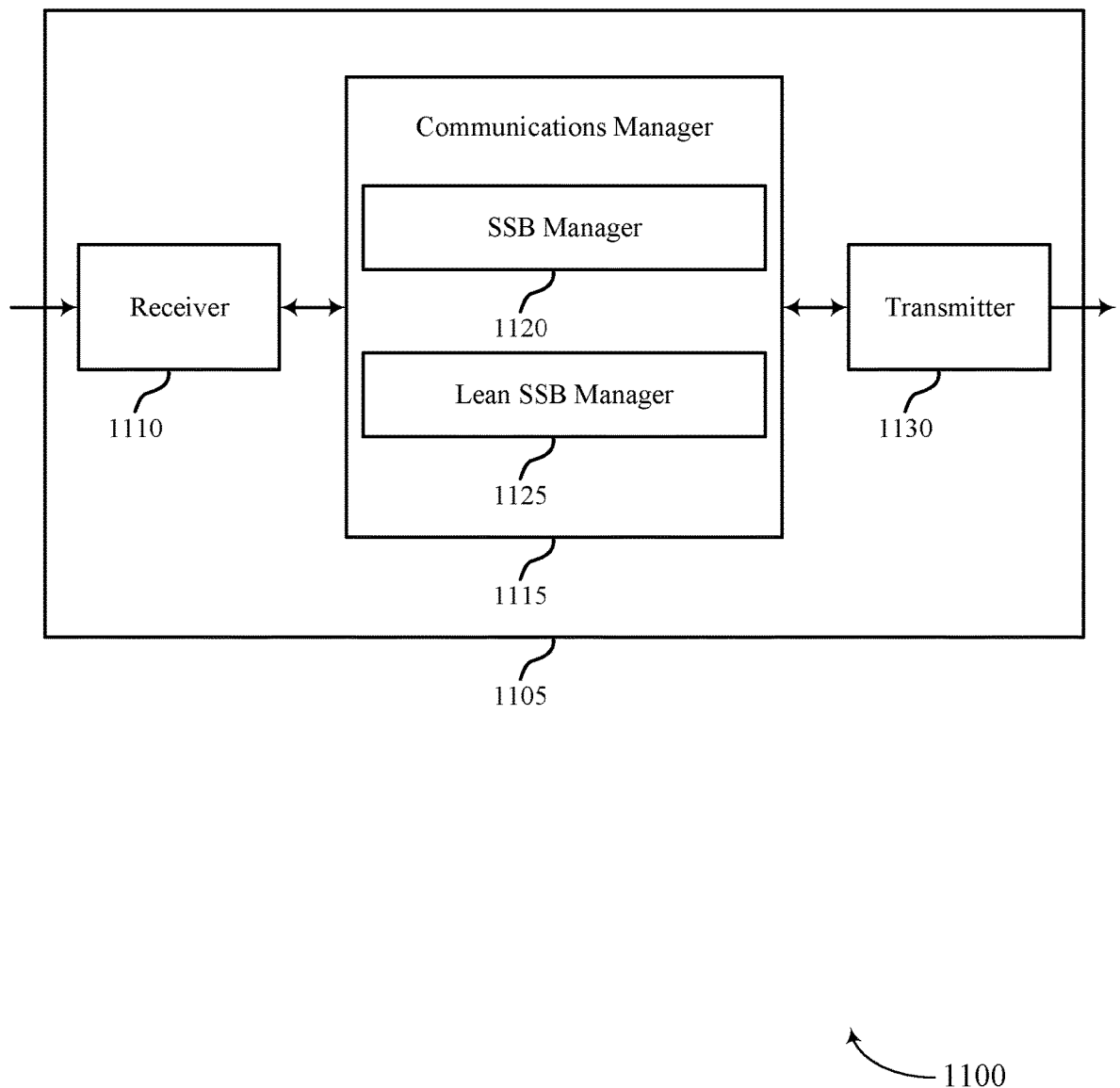

FIG. 11 shows a block diagram 1100 of a device 1105 that supports lean SSBs for reduced capability devices in accordance with aspects of the present disclosure. The device 1105 may be an example of aspects of a device 1005, or a base station 105 as described herein. The device 1105 may include a receiver 1110, a communications manager 1115, and a transmitter 1130. The device 1105 may also include a processor. Each of these components may be in communication with one another (e.g., via one or more buses).

The receiver 1110 may receive information such as packets, user data, or control information associated with various information channels (e.g., control channels, data channels, and information related to lean SSBs for reduced capability devices). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include an SSB manager 1120 and a lean SSB manager 1125. The communications manager 1115 may be an example of aspects of the communications manager 1310 described herein.

The SSB manager 1120 may transmit a second synchronization block in a second bandwidth region.

The lean SSB manager 1125 may transmit a first synchronization block in a first bandwidth region based on a beam management procedure, where the first synchronization block includes a subset of signals in the second synchronization block.

The transmitter 1130 may transmit signals generated by other components of the device 1105. In some examples, the transmitter 1130 may be collocated with a receiver 1110 in a transceiver module. For example, the transmitter 1130 may be an example of aspects of the transceiver 1320 described with reference to FIG. 13. The transmitter 1130 may utilize a single antenna or a set of antennas.

Figure 12:
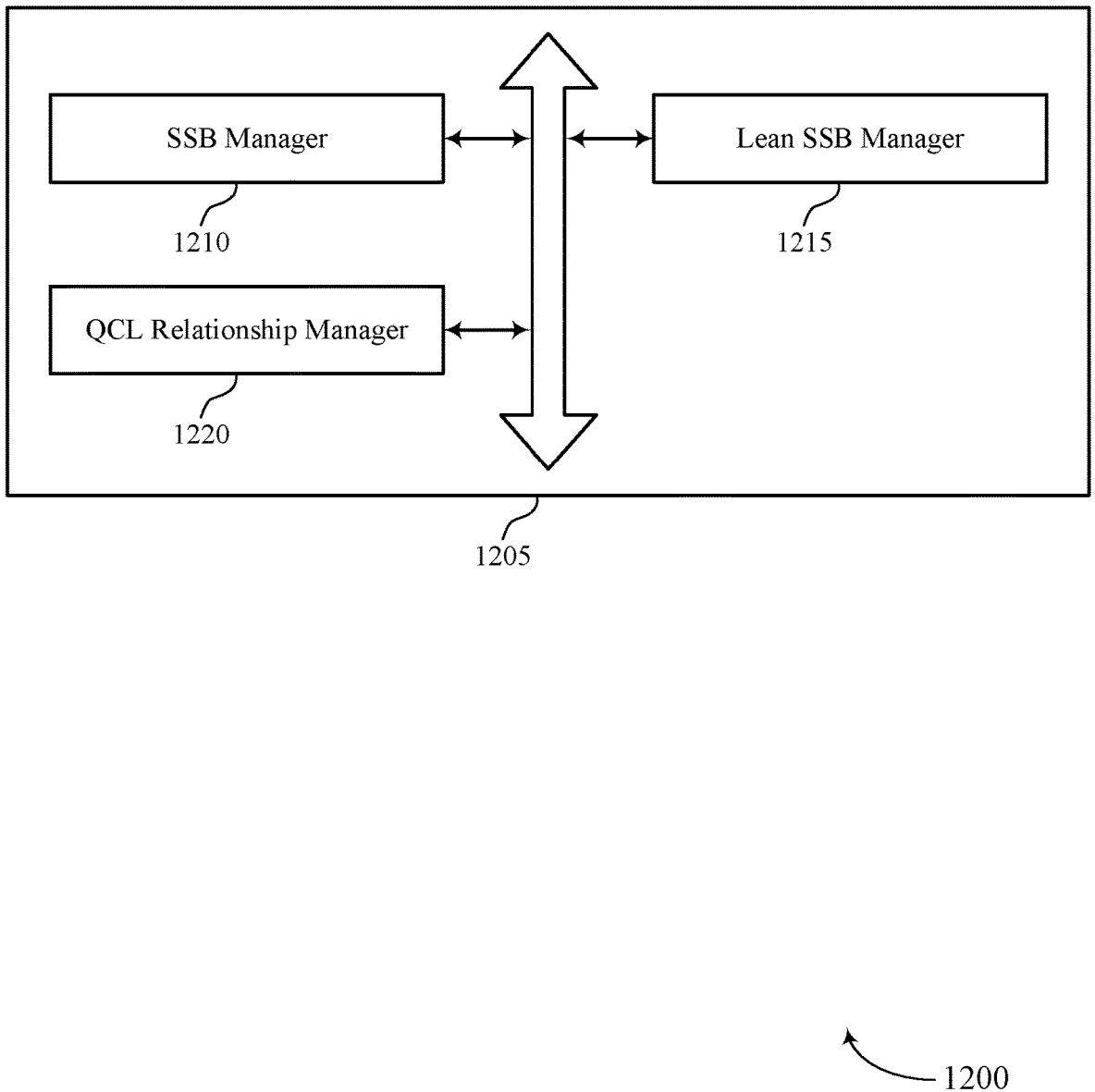
FIG. 12 shows a block diagram of a communications manager that supports lean SSBs for reduced capability devices in accordance with aspects of the present disclosure.

FIG. 12 shows a block diagram 1200 of a communications manager 1205 that supports lean SSBs for reduced capability devices in accordance with aspects of the present disclosure. The communications manager 1205 may be an example of aspects of a communications manager 1015, a communications manager 1115, or a communications manager 1310 described herein. The communications manager 1205 may include an SSB manager 1210, a lean SSB manager 1215, and a QCL relationship manager 1220. Each of these modules may communicate, directly or indirectly, with one another (e.g., via one or more buses).

The SSB manager 1210 may transmit a second synchronization block in a second bandwidth region. The lean SSB manager 1215 may transmit a first synchronization block in a first bandwidth region based on a beam management procedure, where the first synchronization block includes a subset of signals in the second synchronization block.

In some examples, transmitting an SSS, where the second synchronization block includes a PSS, the SSS, and a PBCH. In some examples, transmitting a PSS, where the second synchronization block includes the PSS, a SSS, and a PBCH.

In some examples, the lean SSB manager 1215 may identify a first center frequency corresponding to the first synchronization block, where the first synchronization block is transmitted based on the identified first center frequency.

In some examples, the lean SSB manager 1215 may identify a first M-sequence associated with the first synchronization block, where the first synchronization block is transmitted based on the identified first M-sequence. In some examples, the lean SSB manager 1215 may identify a second M-sequence associated with the second synchronization block.

In some examples, the lean SSB manager 1215 may identify a parameter of the second M-sequence, where the first M-sequence is identified based on the identified second M-sequence and the identified parameter.

In some examples, the lean SSB manager 1215 may transmit, to a UE, an indication of the identified parameter. In some examples, the lean SSB manager 1215 may transmit one or more repetitions of the subset of signals in the second synchronization block.

In some examples, the lean SSB manager 1215 may transmit the first synchronization block with one or more additional beams than the subset of signals in the second synchronization block. In some examples, the lean SSB manager 1215 may transmit downlink shared channel data in addition to the subset of signals in the second synchronization block. In some cases, the first center frequency is different from a second center frequency corresponding to the second synchronization block.

In some cases, the beam management procedure includes one or more of a radio resource management measurement, a beam tracking procedure, a frequency tracking procedure, or a time tracking procedure based on the first synchronization block. In some cases, the first synchronization block and the subset of signals in the second synchronization block are associated with a same resource block structure.

The QCL relationship manager 1220 may transmit a TCI state indicating a QCL relationship, where the first synchronization block is transmitted based on the QCL relationship.

In some cases, the QCL relationship includes one or more of a second synchronization block and first synchronization block QCL relationship, a first synchronization block and tracking reference signal QCL relationship, a first synchronization block and CSI-RS for beamforming QCL relationship, a first synchronization block and CSI-RS for channel state information QCL relationship, a first synchronization block and DMRS for downlink control channel QCL relationship, or a first synchronization block and DMRS for downlink shared channel QCL relationship.

Figure 13:
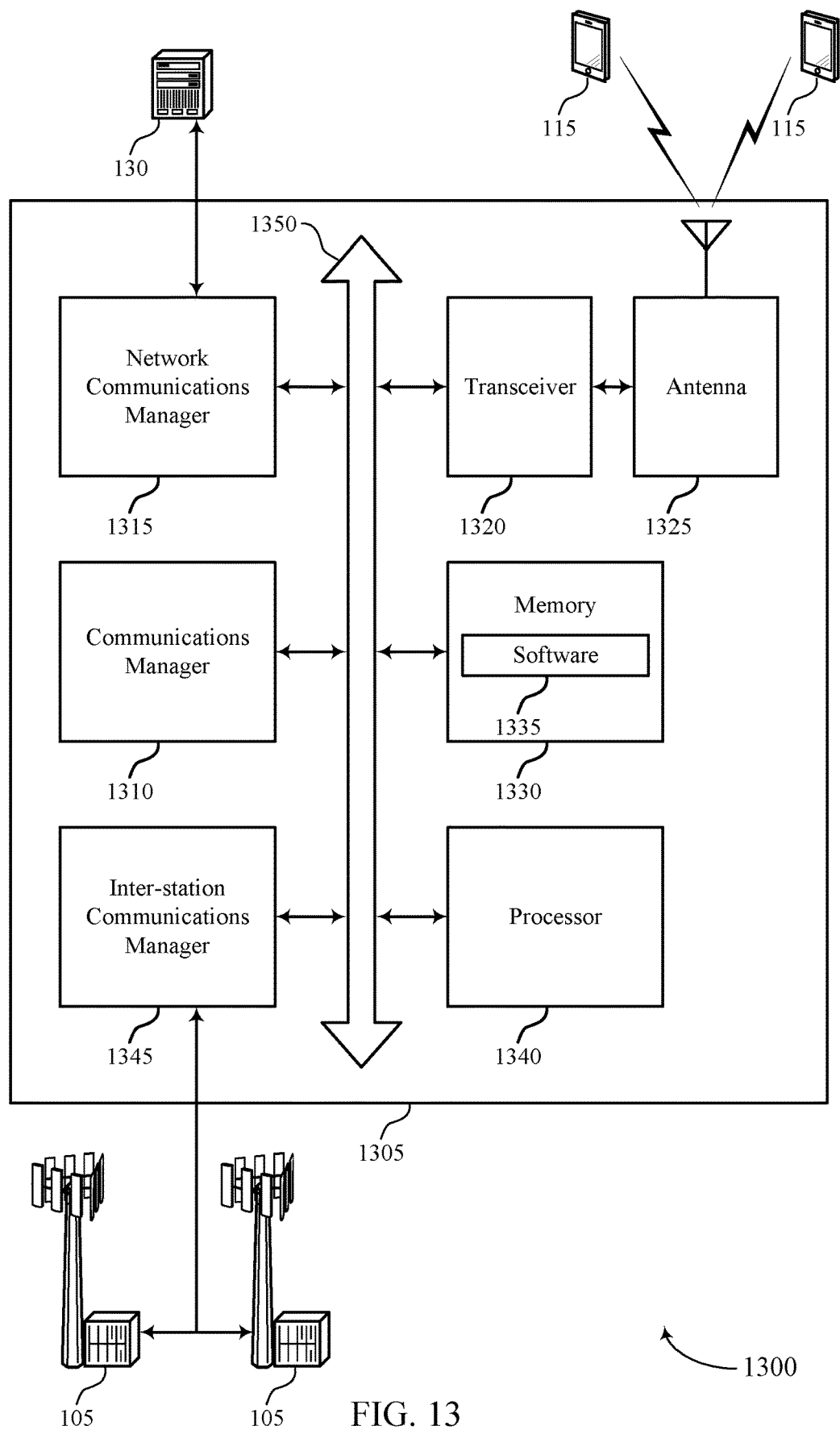
FIG. 13 shows a diagram of a system including a device that supports lean SSBs for reduced capability devices in accordance with aspects of the present disclosure.

FIG. 13 shows a diagram of a system 1300 including a device 1305 that supports lean SSBs for reduced capability devices in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The communications manager 1310 may transmit a second synchronization block in a second bandwidth region and transmit a first synchronization block in a first bandwidth region based on a beam management procedure, where the first synchronization block includes a subset of signals in the second synchronization block.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code or software 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting lean SSBs for reduced capability devices).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The software 1335 may include instructions to implement aspects of the present disclosure, including instructions to support wireless communications. The software 1335 may be stored in a non-transitory computer-readable medium such as system memory or other type of memory. In some cases, the software 1335 may not be directly executable by the processor 1340 but may cause a computer (e.g., when compiled and executed) to perform functions described herein.

Figure 14:
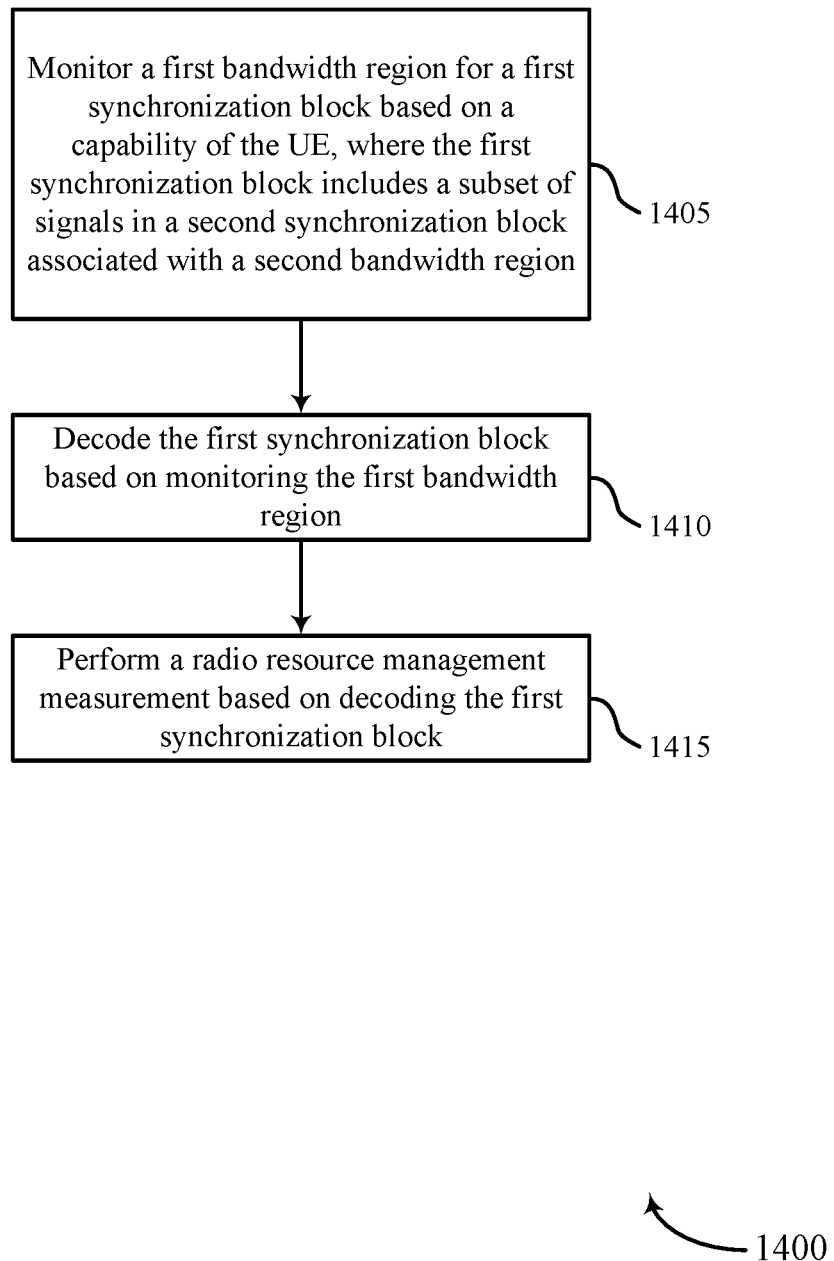
FIGS. 14 through 17 show flowcharts illustrating methods that support lean SSBs for reduced capability devices in accordance with aspects of the present disclosure.

FIG. 14 shows a flowchart illustrating a method 1400 that supports lean SSBs for reduced capability devices in accordance with aspects of the present disclosure. The operations of method 1400 may be implemented by a UE 115 or its components as described herein. For example, the operations of method 1400 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1405, the UE may monitor a first bandwidth region for a first synchronization block based on a capability of the UE, where the first synchronization block includes a subset of signals in a second synchronization block associated with a second bandwidth region. The operations of 1405 may be performed according to the methods described herein. In some examples, aspects of the operations of 1405 may be performed by a NBWP manager as described with reference to FIGS. 6 through 9.

At 1410, the UE may decode the first synchronization block based on monitoring the first bandwidth region. The operations of 1410 may be performed according to the methods described herein. In some examples, aspects of the operations of 1410 may be performed by a lean SSB manager as described with reference to FIGS. 6 through 9.

At 1415, the UE may perform a radio resource management measurement based on decoding the first synchronization block. The operations of 1415 may be performed according to the methods described herein. In some examples, aspects of the operations of 1415 may be performed by a beam manager as described with reference to FIGS. 6 through 9.

Figure 15:
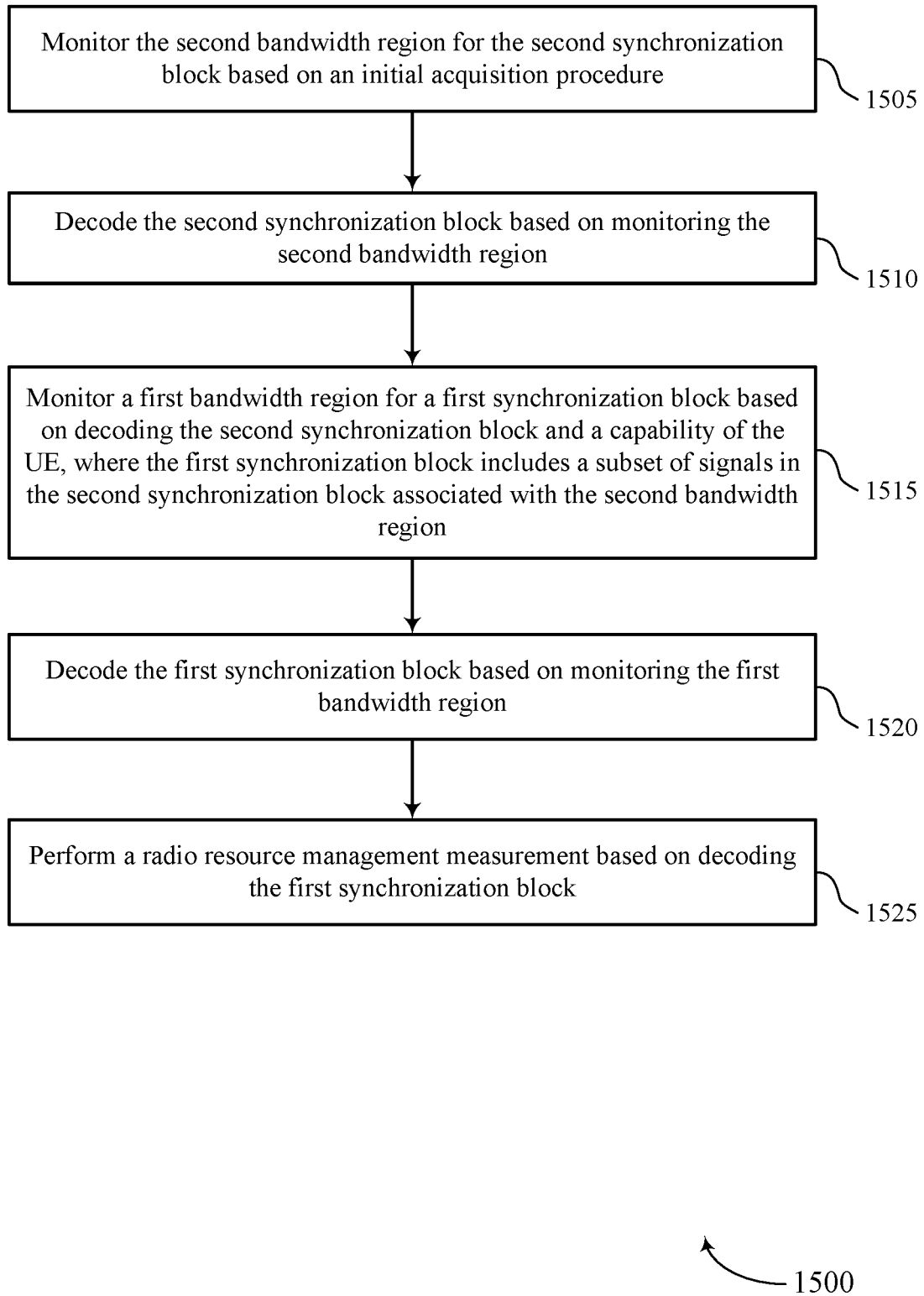

FIG. 15 shows a flowchart illustrating a method 1500 that supports lean SSBs for reduced capability devices in accordance with aspects of the present disclosure. The operations of method 1500 may be implemented by a UE 115 or its components as described herein. For example, the operations of method 1500 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1505, the UE may monitor the second bandwidth region (e.g., a BWP) for the second synchronization block (e.g., an SSB including a PSS, SSS, and PBCH) based on an initial acquisition procedure. The operations of 1505 may be performed according to the methods described herein. In some examples, aspects of the operations of 1505 may be performed by a BWP manager as described with reference to FIGS. 6 through 9.

At 1510, the UE may decode the second synchronization block based on monitoring the second bandwidth region. The operations of 1510 may be performed according to the methods described herein. In some examples, aspects of the operations of 1510 may be performed by an SSB manager as described with reference to FIGS. 6 through 9.

At 1515, the UE may monitor a first bandwidth region (e.g., a NBWP) for a first synchronization block (e.g., a lean SSB) based on decoding the second synchronization block and a capability (e.g., bandwidth reduced capability) of the UE, where the first synchronization block includes a subset of signals (e.g., a PSS or SSS) in the second synchronization block associated with the second bandwidth region. For example, in some cases, the UE may monitor for an SSB for initial access, and may then be configured with one or more NBWPs and use lean SSBs for beam management procedures. The operations of 1515 may be performed according to the methods described herein. In some examples, aspects of the operations of 1515 may be performed by a NBWP manager as described with reference to FIGS. 6 through 9.

At 1520, the UE may decode the first synchronization block based on monitoring the first bandwidth region. The operations of 1520 may be performed according to the methods described herein. In some examples, aspects of the operations of 1520 may be performed by a lean SSB manager as described with reference to FIGS. 6 through 9.

At 1525, the UE may perform a radio resource management measurement based on decoding the first synchronization block. The operations of 1525 may be performed according to the methods described herein. In some examples, aspects of the operations of 1525 may be performed by a beam manager as described with reference to FIGS. 6 through 9.

Figure 16:
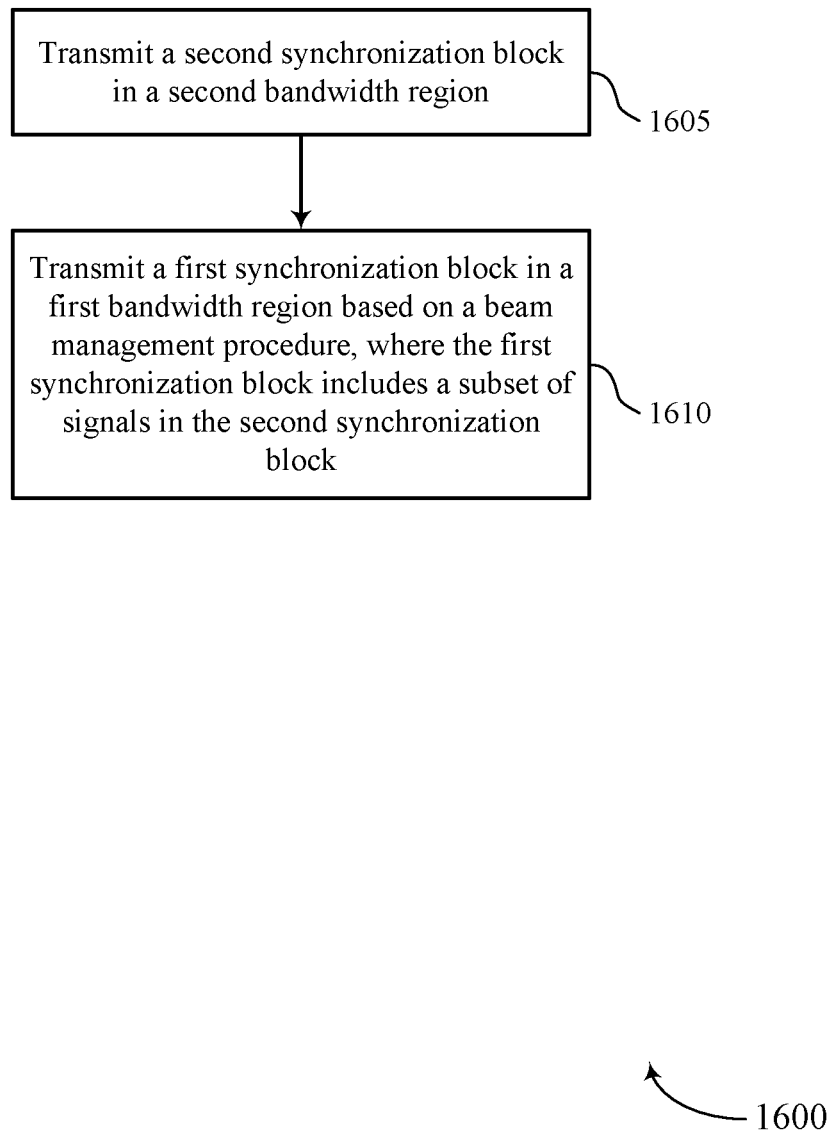

FIG. 16 shows a flowchart illustrating a method 1600 that supports lean SSBs for reduced capability devices in accordance with aspects of the present disclosure. The operations of method 1600 may be implemented by a base station 105 or its components as described herein. For example, the operations of method 1600 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1605, the base station may transmit a second synchronization block in a second bandwidth region. The operations of 1605 may be performed according to the methods described herein. In some examples, aspects of the operations of 1605 may be performed by an SSB manager as described with reference to FIGS. 10 through 13.

At 1610, the base station may transmit a first synchronization block in a first bandwidth region based on a beam management procedure, where the first synchronization block includes a subset of signals in the second synchronization block. The operations of 1610 may be performed according to the methods described herein. In some examples, aspects of the operations of 1610 may be performed by a lean SSB manager as described with reference to FIGS. 10 through 13.

Figure 17:
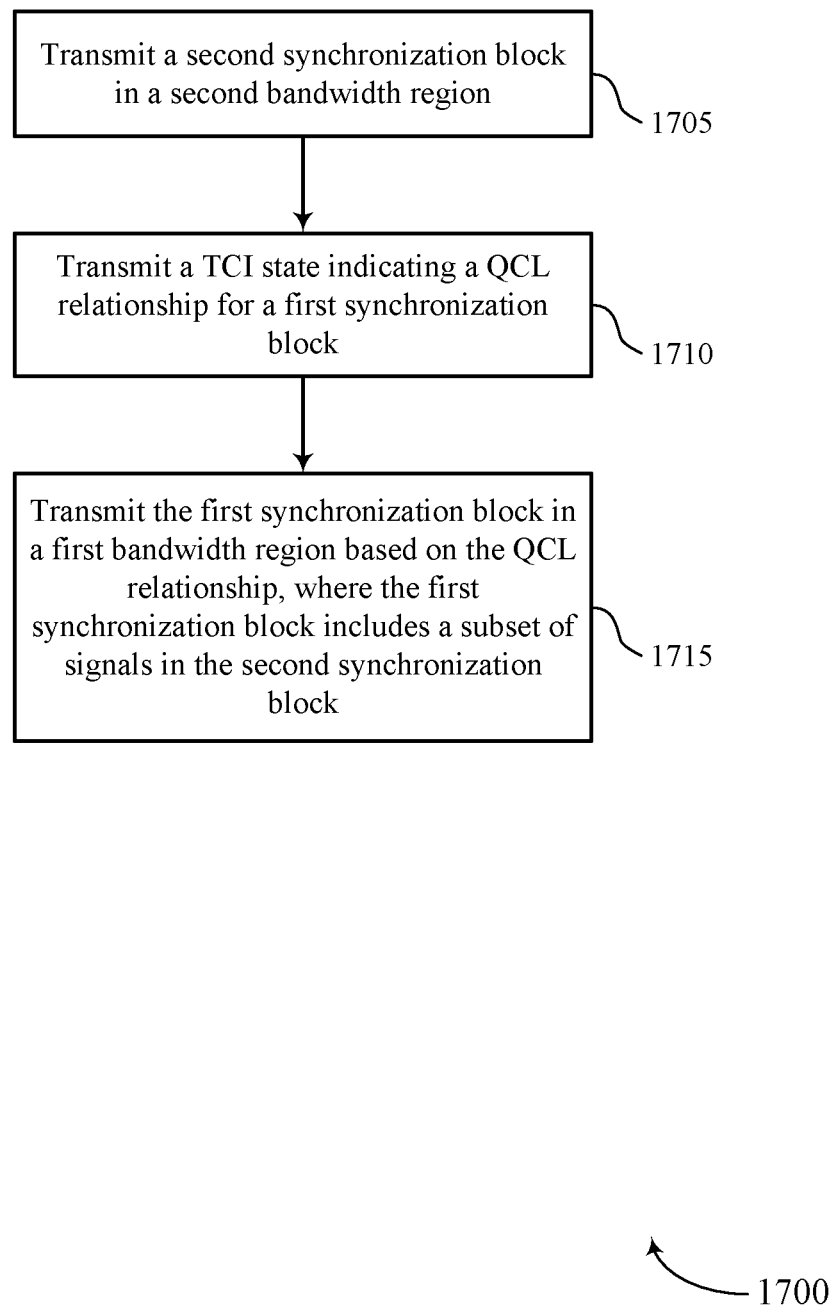

FIG. 17 shows a flowchart illustrating a method 1700 that supports lean SSBs for reduced capability devices in accordance with aspects of the present disclosure. The operations of method 1700 may be implemented by a base station 105 or its components as described herein. For example, the operations of method 1700 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1705, the base station may transmit a second synchronization block (e.g., an SSB including a PSS, SSS, and PBCH) in a second bandwidth region (e.g., in a BWP). The operations of 1705 may be performed according to the methods described herein. In some examples, aspects of the operations of 1705 may be performed by an SSB manager as described with reference to FIGS. 10 through 13.

At 1710, the base station may transmit a TCI state indicating a QCL relationship for a first synchronization block (e.g., for a lean SSB). The operations of 1710 may be performed according to the methods described herein. In some examples, aspects of the operations of 1710 may be performed by a QCL relationship manager as described with reference to FIGS. 10 through 13.

At 1715, the base station may transmit the first synchronization block in a first bandwidth region (e.g., in a NBWP) based on the indicated QCL relationship (e.g., for beam management procedures by one or more UEs), where the first synchronization block includes a subset of signals in the second synchronization block (e.g., such as the SSS or the PSS). The operations of 1715 may be performed according to the methods described herein. In some examples, aspects of the operations of 1715 may be performed by a lean SSB manager as described with reference to FIGS. 10 through 13.

The following provides an overview of aspects of the present disclosure:

Aspect 1: A method for wireless communication at a UE, comprising: monitoring a first bandwidth region for a first synchronization block based at least in part on a capability of the UE, wherein the first synchronization block comprises a subset of signals in a second synchronization block associated with a second bandwidth region; decoding the first synchronization block based at least in part on monitoring the first bandwidth region; and performing a radio resource management measurement based at least in part on decoding the first synchronization block.

Aspect 2: The method of aspect 1, further comprising: monitoring the second bandwidth region for the second synchronization block based at least in part on an initial acquisition procedure; and decoding the second synchronization block based at least in part on monitoring the second bandwidth region, wherein the UE monitors the first bandwidth region for the first synchronization block based at least in part on decoding the second synchronization block and the capability of the UE.

Aspect 3: The method of any of aspects 1 through 2, wherein monitoring the first bandwidth region comprises: monitoring the first bandwidth region for a SSS, wherein the second synchronization block comprises a PSS, the SSS, and a PBCH.

Aspect 4: The method of any of aspects 1 through 3, wherein monitoring the first bandwidth region comprises: monitoring the first bandwidth region for a PSS, wherein the second synchronization block comprises the PSS, a SSS, and a PBCH.

Aspect 5: The method of any of aspects 1 through 4, further comprising: identifying a first center frequency corresponding to the first synchronization block, wherein the first bandwidth region is monitored for the first synchronization block based at least in part on the identified first center frequency.

Aspect 6: The method of aspect 5, wherein the first center frequency is different from a second center frequency corresponding to the second synchronization block.

Aspect 7: The method of any of aspects 1 through 6, further comprising: identifying a first M-sequence associated with the first synchronization block, wherein the first synchronization block is decoded based at least in part on the identified first M-sequence.

Aspect 8: The method of aspect 7, further comprising: identifying a second M-sequence associated with the second synchronization block; and identifying a parameter of the second M-sequence, wherein the first M-sequence is identified based at least in part on the identified second M-sequence and the identified parameter.

Aspect 9: The method of aspect 8, further comprising: receiving an indication of the parameter, wherein the parameter is identified based at least in part on the received indication.

Aspect 10: The method of any of aspects 1 through 9, further comprising: performing one or more of a beam tracking update, a frequency tracking update, or a time tracking update based at least in part on the first synchronization block.

Aspect 11: The method of any of aspects 1 through 10, wherein the first synchronization block and the subset of signals in the second synchronization block are associated with a same resource block structure.

Aspect 12: The method of any of aspects 1 through 11, wherein the first synchronization block and the subset of signals in the second synchronization block are associated with a same symbol start time and a same symbol gap.

Aspect 13: The method of any of aspects 1 through 12, wherein the first synchronization block comprises one or more repetitions of the subset of signals in the second synchronization block.

Aspect 14: The method of any of aspects 1 through 13, wherein the first synchronization block is associated with one or more additional beams than the subset of signals in the second synchronization block.

Aspect 15: The method of any of aspects 1 through 14, wherein the first synchronization block comprises downlink shared channel data in addition to the subset of signals in the second synchronization block.

Aspect 16: The method of any of aspects 1 through 15, further comprising: receiving a TCI state indicating a QCL relationship, wherein the first synchronization block is decoded based at least in part on the QCL relationship.

Aspect 17: The method of aspect 16, wherein the QCL relationship comprises one or more of a second synchronization block and first synchronization block QCL relationship, a first synchronization block and tracking reference signal QCL relationship, a first synchronization block and CSI-RS for beamforming QCL relationship, a first synchronization block and CSI-RS for channel state information QCL relationship, a first synchronization block and DMRS for downlink control channel QCL relationship, or a first synchronization block and DMRS for downlink shared channel QCL relationship.

Aspect 18: The method of any of aspects 1 through 17, wherein the capability of the UE comprises a UE bandwidth reduction capability.

Aspect 19: A method for wireless communication at a base station, comprising: transmitting a second synchronization block in a second bandwidth region; and transmitting a first synchronization block in a first bandwidth region based at least in part on a beam management procedure, wherein the first synchronization block comprises a subset of signals in the second synchronization block.

Aspect 20: The method of aspect 19, wherein transmitting the first synchronization block comprises: transmitting a SSS, wherein the second synchronization block comprises a PSS, the SSS, and a PBCH.

Aspect 21: The method of any of aspects 19, wherein transmitting the first synchronization block comprises: transmitting a PSS, wherein the second synchronization block comprises the PSS, a SSS, and a PBCH.

Aspect 22: The method of any of aspects 19 through 21, further comprising: identifying a first center frequency corresponding to the first synchronization block, wherein the first synchronization block is transmitted based at least in part on the identified first center frequency.

Aspect 23: The method of aspect 22, wherein the first center frequency is different from a second center frequency corresponding to the second synchronization block.

Aspect 24: The method of any of aspects 19 through 23, further comprising: identifying a first M-sequence associated with the first synchronization block, wherein the first synchronization block is transmitted based at least in part on the identified first M-sequence.

Aspect 25: The method of aspect 24, further comprising: identifying a second M-sequence associated with the second synchronization block; and identifying a parameter of the second M-sequence, wherein the first M-sequence is identified based at least in part on the identified second M-sequence and the identified parameter.

Aspect 26: The method of aspect 25, further comprising: transmitting, to a UE, an indication of the identified parameter.

Aspect 27: The method of any of aspects 19 through 26, wherein the beam management procedure comprises one or more of a radio resource management measurement, a beam tracking procedure, a frequency tracking procedure, or a time tracking procedure based at least in part on the first synchronization block.

Aspect 28: The method of any of aspects 19 through 27, wherein the first synchronization block and the subset of signals in the second synchronization block are associated with a same resource block structure.

Aspect 29: The method of any of aspects 19 through 28, wherein transmitting the first synchronization block comprises: transmitting one or more repetitions of the subset of signals in the second synchronization block.

Aspect 30: The method of any of aspects 19 through 29, wherein transmitting the first synchronization block comprises: transmitting the first synchronization block with one or more additional beams than the subset of signals in the second synchronization block.

Aspect 31: The method of any of aspects 19 through 30, wherein transmitting the first synchronization block comprises: transmitting downlink shared channel data in addition to the subset of signals in the second synchronization block.

Aspect 32: The method of any of aspects 19 through 31, further comprising: transmitting a TCI state indicating a QCL relationship, wherein the first synchronization block is transmitted based at least in part on the QCL relationship.

Aspect 33: The method of aspect 32, wherein the QCL relationship comprises one or more of a second synchronization block and first synchronization block QCL relationship, a first synchronization block and tracking reference signal QCL relationship, a first synchronization block and CSI-RS for beamforming QCL relationship, a first synchronization block and CSI-RS for channel state information QCL relationship, a first synchronization block and DMRS for downlink control channel QCL relationship, or a first synchronization block and DMRS for downlink shared channel QCL relationship.

Aspect 34: An apparatus for wireless communication at a UE, comprising a processor; memory coupled with the processor; and instructions stored in the memory and executable by the processor to cause the apparatus to perform a method of any of aspects 1 through 18.

Aspect 35: An apparatus for wireless communication at a UE, comprising at least one means for performing a method of any of aspects 1 through 18.

Aspect 36: A non-transitory computer-readable medium storing code for wireless communication at a UE, the code comprising instructions executable by a processor to perform a method of any of aspects 1 through 18.

Aspect 37: An apparatus for wireless communication at a base station, comprising a processor; memory coupled with the processor; and instructions stored in the memory and executable by the processor to cause the apparatus to perform a method of any of aspects 19 through 33.

Aspect 38: An apparatus for wireless communication at a base station, comprising at least one means for performing a method of any of aspects 19 through 33.

Aspect 39: A non-transitory computer-readable medium storing code for wireless communication at a base station, the code comprising instructions executable by a processor to perform a method of any of aspects 19 through 33.

It should be noted that the methods described herein describe possible implementations, and that the operations and the steps may be rearranged or otherwise modified and that other implementations are possible. Further, aspects from two or more of the methods may be combined. The following examples are given by way of illustration. Aspects of the following examples may be combined with aspects or embodiments shown or discussed in relation to the figures or elsewhere herein.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1X, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and global system for mobile communication (GSM) are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed or unlicensed) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any other processor, controller, microcontroller, or state machine. A processor may also be implemented as a combination of computing devices (e.g., a combination of a digital signal processor (DSP) and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
monitoring a first bandwidth region for a first synchronization block based at least in part on an initial acquisition procedure;
decoding the first synchronization block based at least in part on monitoring the first bandwidth region;
monitoring a second bandwidth region for a second synchronization block based at least in part on a capability of the UE and decoding the first synchronization block, wherein the second synchronization block comprises a subset of signals in the first synchronization block associated with the first bandwidth region;
decoding the second synchronization block based at least in part on monitoring the second bandwidth region; and
performing a radio resource management measurement based at least in part on decoding the second synchronization block.

2. The method of claim 1, wherein monitoring the second bandwidth region comprises:
monitoring the second bandwidth region for a secondary synchronization signal, wherein the first synchronization block comprises a primary synchronization signal, the secondary synchronization signal, and a physical broadcast channel.

3. The method of claim 1, wherein monitoring the second bandwidth region comprises:
monitoring the second bandwidth region for a primary synchronization signal, wherein the first synchronization block comprises the primary synchronization signal, a secondary synchronization signal, and a physical broadcast channel.

4. The method of claim 1, further comprising:
identifying a first center frequency corresponding to the second synchronization block, wherein the second bandwidth region is monitored for the second synchronization block based at least in part on the identified first center frequency.

5. The method of claim 4, wherein the first center frequency is different from a second center frequency corresponding to the first synchronization block.

6. The method of claim 1, further comprising:
identifying a first M-sequence associated with the second synchronization block, wherein the second synchronization block is decoded based at least in part on the identified first M-sequence.

7. The method of claim 6, further comprising:
identifying a second M-sequence associated with the first synchronization block; and
identifying a parameter of the second M-sequence, wherein the first M-sequence is identified based at least in part on the identified second M-sequence and the identified parameter.

8. The method of claim 7, further comprising:
receiving an indication of the parameter, wherein the parameter is identified based at least in part on the received indication.

9. The method of claim 1, further comprising:
performing one or more of a beam tracking update, a frequency tracking update, or a time tracking update based at least in part on the second synchronization block.

10. The method of claim 1, wherein the second synchronization block and the subset of signals in the first synchronization block are associated with a same resource block structure.

11. The method of claim 1, wherein the second synchronization block and the subset of signals in the first synchronization block are associated with a same symbol start time and a same symbol gap.

12. The method of claim 1, wherein the second synchronization block comprises one or more repetitions of the subset of signals in the first synchronization block.

13. The method of claim 1, wherein the second synchronization block is associated with one or more additional beams than the subset of signals in the first synchronization block.

14. The method of claim 1, wherein the second synchronization block comprises downlink shared channel data in addition to the subset of signals in the first synchronization block.

15. The method of claim 1, further comprising:
receiving a transmission configuration indicator state indicating a quasi-colocation relationship, wherein the second synchronization block is decoded based at least in part on the quasi-colocation relationship.

16. The method of claim 15, wherein the quasi-colocation relationship comprises one or more of a first synchronization block and second synchronization block quasi-colocation relationship, a second synchronization block and tracking reference signal quasi-colocation relationship, a second synchronization block and channel state information reference signal for beamforming quasi-colocation relationship, a second synchronization block and channel state information reference signal for channel state information quasi-colocation relationship, a second synchronization block and demodulation reference signal for downlink control channel quasi-colocation relationship, or a second synchronization block and demodulation reference signal for downlink shared channel quasi-colocation relationship.

17. The method of claim 1, wherein the capability of the UE comprises a UE bandwidth reduction capability.

18. A method for wireless communication at a base station, comprising:
transmitting a first synchronization block in a first bandwidth region based at least in part on an initial acquisition procedure; and
transmitting a second synchronization block in a second bandwidth region based at least in part on a beam management procedure and transmitting the first synchronization block, wherein the second synchronization block comprises a subset of signals in the first synchronization block associated with the first bandwidth region.

19. The method of claim 18, wherein transmitting the second synchronization block comprises:
transmitting a secondary synchronization signal, wherein the first synchronization block comprises a primary synchronization signal, the secondary synchronization signal, and a physical broadcast channel.

20. The method of claim 18, wherein transmitting the second synchronization block comprises:
transmitting a primary synchronization signal, wherein the first synchronization block comprises the primary synchronization signal, a secondary synchronization signal, and a physical broadcast channel.

21. The method of claim 18, further comprising:
identifying a first center frequency corresponding to the second synchronization block, wherein the second synchronization block is transmitted based at least in part on the identified first center frequency.

22. The method of claim 18, further comprising:
identifying a first M-sequence associated with the second synchronization block, wherein the second synchronization block is transmitted based at least in part on the identified first M-sequence.

23. The method of claim 22, further comprising:
identifying a second M-sequence associated with the first synchronization block; and
identifying a parameter of the second M-sequence, wherein the first M-sequence is identified based at least in part on the identified second M-sequence and the identified parameter.

24. The method of claim 18, wherein transmitting the second synchronization block comprises:
transmitting one or more repetitions of the subset of signals in the first synchronization block.

25. The method of claim 18, wherein transmitting the second synchronization block comprises:
transmitting the second synchronization block with one or more additional beams than the subset of signals in the first synchronization block.

26. The method of claim 18, wherein transmitting the second synchronization block comprises:
transmitting downlink shared channel data in addition to the subset of signals in the first synchronization block.

27. The method of claim 18, further comprising:
transmitting a transmission configuration indicator state indicating a quasi-colocation relationship, wherein the second synchronization block is transmitted based at least in part on the quasi-colocation relationship.

28. An apparatus for wireless communication at a user equipment (UE), comprising:
a processor,
memory coupled with the processor; and
instructions stored in the memory and executable by the processor to cause the apparatus to:
monitor a first bandwidth region for a first synchronization block based at least in part on an initial acquisition procedure;
decode the first synchronization block based at least in part on monitoring the first bandwidth region;
monitor a second bandwidth region for a second synchronization block based at least in part on a capability of the UE and decoding the first synchronization block, wherein the second synchronization block comprises a subset of signals in the first synchronization block associated with the first bandwidth region;
decode the second synchronization block based at least in part on monitoring the second bandwidth region; and
perform a radio resource management measurement based at least in part on decoding the second synchronization block.

29. An apparatus for wireless communication at a base station, comprising:
a processor,
memory coupled with the processor; and
instructions stored in the memory and executable by the processor to cause the apparatus to:
transmit a first synchronization block in a first bandwidth region based at least in part on an initial acquisition procedure; and
transmit a second synchronization block in a second bandwidth region based at least in part on a beam management procedure and transmitting the first synchronization block, wherein the second synchronization block comprises a subset of signals in the first synchronization block associated with the first bandwidth region.

* * * * *